United States Patent
Shishido et al.

(10) Patent No.: US 9,883,131 B2
(45) Date of Patent: Jan. 30, 2018

(54) IMAGING DEVICE INCLUDING PHOTOELECTRIC CONVERTER AND CHARGE TRANSFER CHANNEL

(71) Applicant: Panasonic Intellectual Property Management Co., Ltd., Osaka (JP)

(72) Inventors: Sanshiro Shishido, Osaka (JP); Ryota Sakaida, Toyama (JP); Yoshiyuki Matsunaga, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/190,198

(22) Filed: Jun. 23, 2016

(65) Prior Publication Data
US 2017/0006241 A1    Jan. 5, 2017

(30) Foreign Application Priority Data
Jul. 2, 2015  (JP) ................................ 2015-133648

(51) Int. Cl.
H04N 5/378  (2011.01)
H04N 5/369  (2011.01)
H04N 5/374  (2011.01)

(52) U.S. Cl.
CPC ........... *H04N 5/378* (2013.01); *H04N 5/3698* (2013.01); *H04N 5/374* (2013.01)

(58) Field of Classification Search
CPC ...... H04N 5/378; H04N 5/3698; H04N 5/374; H04N 5/357; H04N 5/372; H04N 5/363;
(Continued)

(56) References Cited

U.S. PATENT DOCUMENTS 8,154,057 B2 *   4/2012   Goto ................. H01L 29/76816
                                                      257/222
8,760,549 B2 *   6/2014   Lehmann .......... H01L 27/14603
                                                      257/222
(Continued)

FOREIGN PATENT DOCUMENTS

JP    2012-501608    1/2012
JP    2012-129658    7/2012
WO    2010/025331   3/2010

OTHER PUBLICATIONS

K. Yasutomi, et al., "A 0.3mm-Resolution Time-of-Flight CMOS Range Imager with Column-Gating Clock-Skew Calibration", ISSCC2014, Dig. pp. 132-133.

*Primary Examiner* — Luong T Nguyen
(74) *Attorney, Agent, or Firm* — McDermott Will & Emery LLP

(57) ABSTRACT

An imaging device includes a photoelectric converter that generates charge; a first charge transfer channel having a first end electrically connected to the photoelectric converter and a second end, and transferring the charge in a direction from the first end to the second end; a second charge transfer channel diverging from the first charge transfer channel at a first position and transferring a first part of the charge; a third charge transfer channel diverging from the first charge transfer channel at a second position different from the first position in the direction and transferring a part of the second part of the charge; and first and second charge accumulators that accumulate at least a part of the first and second part of the charge respectively. The imaging device does not include a gate that switches between cutoff and transfer of charge, in the first charge transfer channel.

18 Claims, 19 Drawing Sheets

(58) Field of Classification Search
CPC ... H04N 5/3696; H04N 5/3742; H01L 27/148
See application file for complete search history.

(56) References Cited

U.S. PATENT DOCUMENTS

| | | | |
|---|---|---|---|
| 9,190,449 B2* | 11/2015 | Kobayashi | H01L 27/14806 |
| 2008/0239466 A1* | 10/2008 | Buettgen | H01L 27/14603 |
| | | | 359/325 |
| 2009/0134437 A1* | 5/2009 | Nakashima | H01L 27/14643 |
| | | | 257/292 |

* cited by examiner

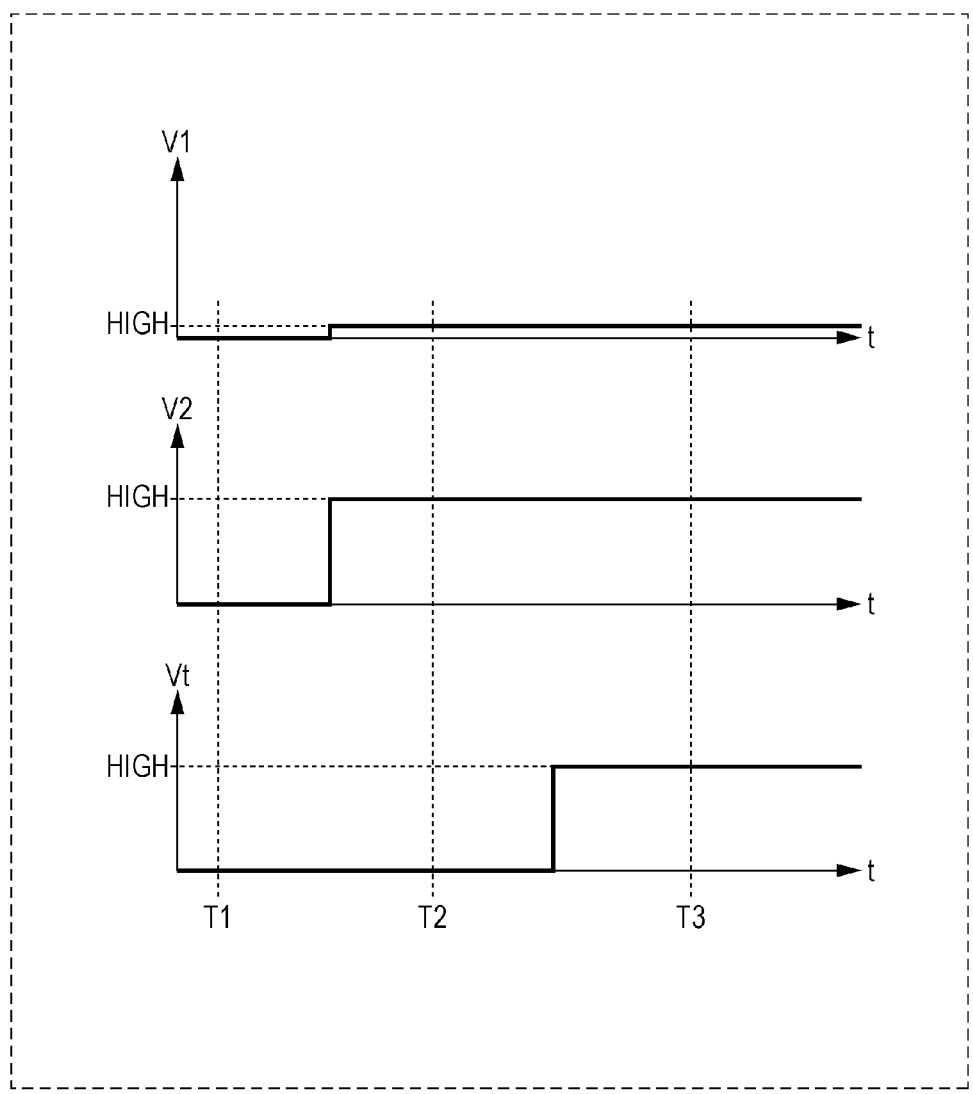

IMAGING DEVICE INCLUDING PHOTOELECTRIC CONVERTER AND CHARGE TRANSFER CHANNEL

BACKGROUND

1. Technical Field

The present disclosure relates to an imaging device.

2. Description of the Related Art

There is a demand for an imaging device that can operate at high speed in performing distance measurement, ultra-high-speed imaging, or the like using fluorescence-lifetime imaging microscopy (FLIM) or time-of-flight method. For example, fluorescence-lifetime imaging microscopy involves applying a light pulse to a test sample and repeatedly detecting fluorescence emitted from the test sample at extremely short time intervals of several nanoseconds or so. It is expected that if the temporal resolution in measurement can be improved, new knowledge about the target to be measured will be obtained.

The temporal resolution in measurement using an imaging device depends on the operating speed of the pixels. For example, in detection using a complementary metal oxide semiconductor (CMOS) imaging device, a cycle consisting of the release of charge in photodiodes (the reset of the photodiodes), the accumulation of charge by exposure, and the transfer of charge to floating diffusion is repeated. That is, the temporal resolution in measurement depends on the time required by this cycle. In particular, the time required by the release of charge from the pixels and the transfer of charge to the floating diffusion in the cycle have a large effect on the high-speed operation of the imaging device.

K. Yasutomi, et. al., "A 0.3 mm-resolution Time-of-Flight CMOS range imager with column-gating clock-skew calibration," ISSCC2014, Dig. pp. 132-133 proposes a structure in which discharge gates are disposed between photodiodes and drains for releasing charge. In this literature, pixels having such a structure are referred to as "draining-only modulation (DOM) pixels." In the DOM pixels, the photodiodes release charge while the discharge gates are opened. On the other hand, the photodiodes can transfer charge to the floating diffusion while the discharge gates are closed. Since the time required to reset the photodiodes is made substantially zero, the DOM pixels have improved temporal resolution.

SUMMARY

However, imaging devices are required to further improve the temporal resolution.

One non-limiting and exemplary embodiment provides the following.

In one general aspect, the techniques disclosed here feature an imaging device comprising: a photoelectric converter that generates charge; a first charge transfer channel having a first end electrically connected to the photoelectric converter and a second end, the first charge transfer channel transferring the charge in a direction from the first end to the second end; a second charge transfer channel diverging from the first charge transfer channel at a first position of the first charge transfer channel, the second charge transfer channel transferring a first part of the charge; a third charge transfer channel diverging from the first charge transfer channel at a second position of the first charge transfer channel, the second position being different from the first position in the direction, the third charge transfer channel transferring a second part of the charge; a first charge accumulator that accumulates at least a part of the first part of the charge; and a second charge accumulator that accumulates at least a part of the second part of the charge. The imaging device does not comprise a gate that switches between cutoff and transfer of charge, in the first charge transfer channel.

It should be noted that general or specific embodiments may be implemented as an element, a device, a system, an integrated circuit, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10 is a timing chart showing an example of a first voltage and a second voltage applied to a control electrode and a gate control voltage applied to a transfer gate electrode according to the second embodiment;

DETAILED DESCRIPTION

Figure 1:
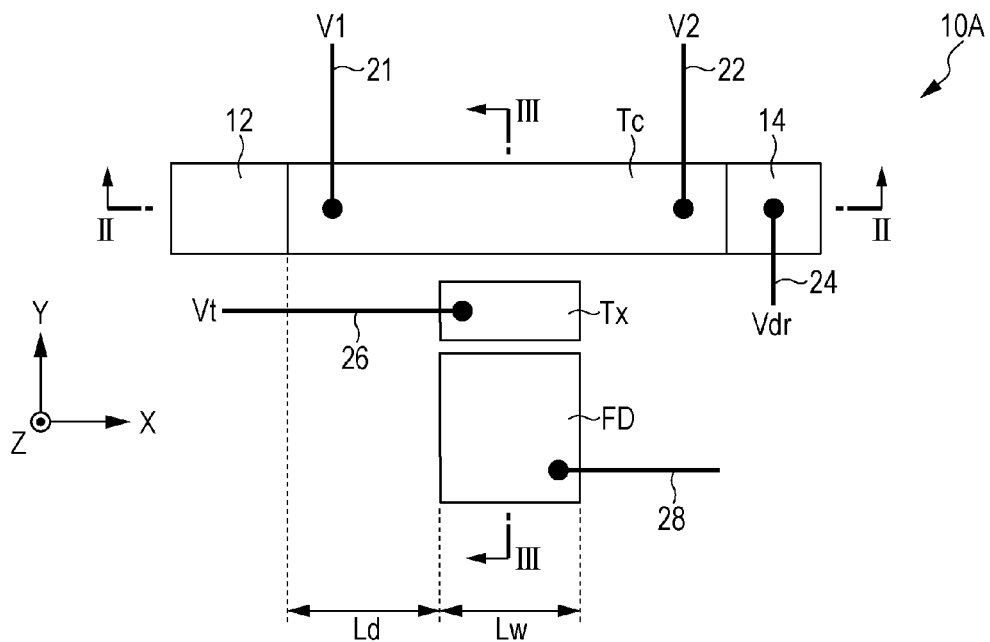
FIG. 1 is a schematic plan view of an imaging device of a first embodiment of the present disclosure.

The above DOM pixels must move charge generated by the photodiodes to the floating diffusion each time the drain gates are closed. For this reason, the temporal resolution of an imaging device using the DOM pixels depends on the response speed of the drain gates and the speed at which charge is transferred from the photodiodes to the floating diffusion. The speed at which charge is transferred from the photodiodes to the floating diffusion is limited by the mobility of the charge in the silicon (Si) substrate. Accordingly, it is difficult to further improve the temporal resolution using the conventional method, which involves transferring charge to the floating diffusion at each reset and reading the charge accumulated in the floating diffusion.

Before describing embodiments of the present disclosure in detail, aspects of the present disclosure will be outlined below.

[Item 1]

An imaging device including:
a photoelectric conversion unit;
a first charge transfer channel that transfers charge generated in the photoelectric conversion unit;
at least one second charge transfer channel diverging from a position on the first charge transfer channel;
at least one first charge accumulation unit that accumulates charge transferred through the at least one second charge transfer channel, of the charge; and
at least one gate that switches between transfer and shutdown of charge through the at least one second transfer channel.

According to Item 1, an imaging device capable of operation at higher speed can be provided. Further, detection can be performed in any time window.

[Item 2]

In the imaging device according to Item 1,
the at least one second charge transfer channel includes multiple second charge transfer channels, and at least one first charge accumulation unit includes multiple first charge accumulation units that each accumulate charge transferred through a corresponding one of the second charge transfer channels.

According to the configuration of Item 2, the charge can be distributed to the first charge accumulation units in accordance with the traveling distance on the first charge transfer channel.

[Item 3]

In the imaging device according to Item 2, the at least one gate includes multiple gates disposed on the second transfer channels.

According to the configuration of Item 3, the transfer of the charge to the first charge accumulation units can be independently controlled.

[Item 4]

The imaging device according to any one of Items 1 to 3 further includes a drain disposed at a terminating end of the first charge transfer channel.

According to the configuration of Item 4, the charge can be transferred through the first charge transfer channel by moving the charge generated in the photoelectric conversion unit to the drain.

[Item 5]

The imaging device according to any one of Items 1 to 3 further includes a second charge accumulation unit that is disposed at a terminating end of the first charge transfer channel and accumulates charge transferred through the first charge transfer channel.

According to the configuration of Item 5, the charge can be distributed to two charge accumulation units at any ratio by controlling the time period during which the gate is opened.

[Item 6]

An imaging device including:
a photoelectric conversion unit;
a drain;
a first charge transfer channel connecting the photoelectric conversion unit and the drain;
at least one charge accumulation unit disposed along the first charge transfer channel;
at least one second charge transfer channel that transfers charge from the first charge transfer channel toward the at least one charge accumulation unit; and
at least one gate located between the first charge transfer channel and the at least one charge accumulation unit.

According to Item 6, an imaging device capable of operation at higher speed can be provided. Further, detection can be performed in any time window.

[Item 7]

In the imaging device according to Item 6, the at least one charge accumulation unit includes multiple charge accumulation units.

According to the configuration of Item 7, temporal resolution that does not depend on the saturation speed of charge can be achieved.

[Item 8]

In the imaging device according to Item 7, the at least one gate includes multiple gates.

According to the configuration of Item 8, the timings when the gates are opened can be independently controlled.

[Item 9]

In the imaging device according to Item 8, the gates include the same number of gates as the number of the charge accumulation units, and the gates are disposed between the charge accumulation units and the first charge transfer channel so as to correspond to the charge accumulation units.

According to the configuration of Item 9, the signal charge can be favorably distributed to two charge accumulation units whose gates are opened.

[Item 10]

The imaging device according to any one of Items 6 to 9 further including:
  a control electrode disposed on the first charge transfer channel and extending along the first charge transfer channel;
  a first power supply line that supplies a first voltage to one end of the control electrode; and
  a second power supply line that supplies a second voltage to the other end of the control electrode.

According to the configuration of Item 10, different voltages can be independently applied to both ends of the control electrode and thus the potential gradient of the first charge transfer channel can be controlled. By controlling the potential gradient of the first charge transfer channel, the transfer speed of signal charge through the first charge transfer channel can be electrically controlled.

[Item 11]

The imaging device according to any one of Items 6 to 9 further including:
  a first control electrode disposed on the first charge transfer channel;
  a second control electrode disposed on the first charge transfer channel so as to be closer to the drain than the first control electrode;
  a first power supply line that supplies a first voltage to the first control electrode; and
  a second power supply line that supplies a second voltage to the second control electrode.

According to the configuration of Item 11, the potentials of the first control electrode and second control electrode can be independently controlled. Thus, the potential gradient of the charge transfer channel can be controlled at higher speed.

[Item 12]

The imaging device according to any one of Items 7 to 9 further including:
  multiple control electrodes disposed on the first charge transfer channel so as to correspond to the charge accumulation units; and
  multiple power supply lines that are disposed so as to correspond to the control electrodes and independently supply voltages to the control electrodes.

According to the configuration of Item 12, it is possible to perform a detection operation that does not depend on the speed at which charge is transferred through the second charge transfer channel.

Now, embodiments of the present disclosure will be described in detail with reference to the accompanying drawings. Any of the embodiments below represents a comprehensive or specific example. The numbers, shapes, materials, elements, the positions and connection forms of the elements, steps, the order of the steps, and the like described in the embodiments are only illustrative and are not intended to limit the present disclosure. The embodiments described in the present specification can be combined with each other unless a contradiction arises. Of the elements of the embodiments, elements which are not described in the independent claims representing the highest concept are described as optional elements. In the following description, elements having substantially the same functions are represented by the same reference signs and may not be described repeatedly.

First Embodiment

Figure 2:
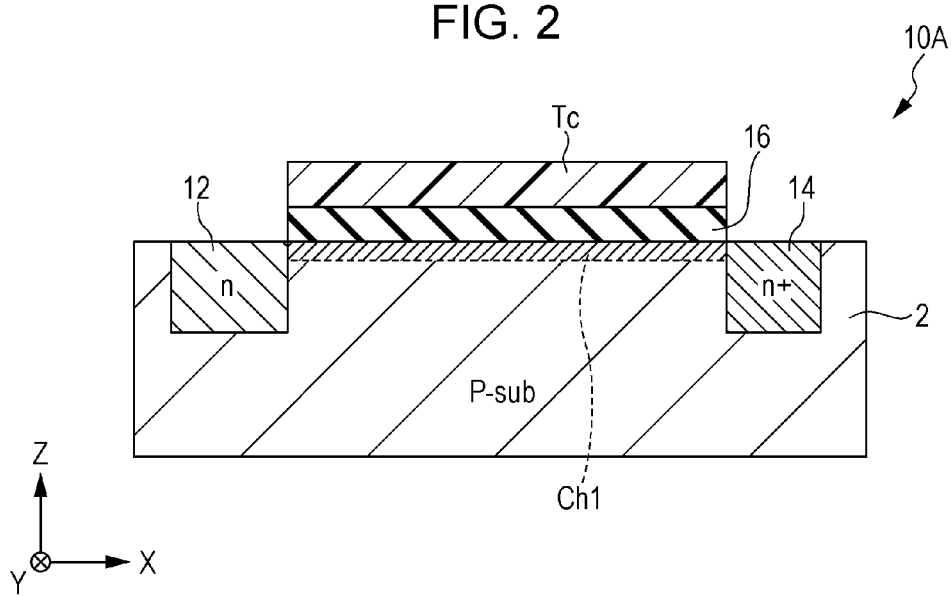
FIG. 2 is a sectional view taken along line II-II shown in FIG. 1.
Figure 3:
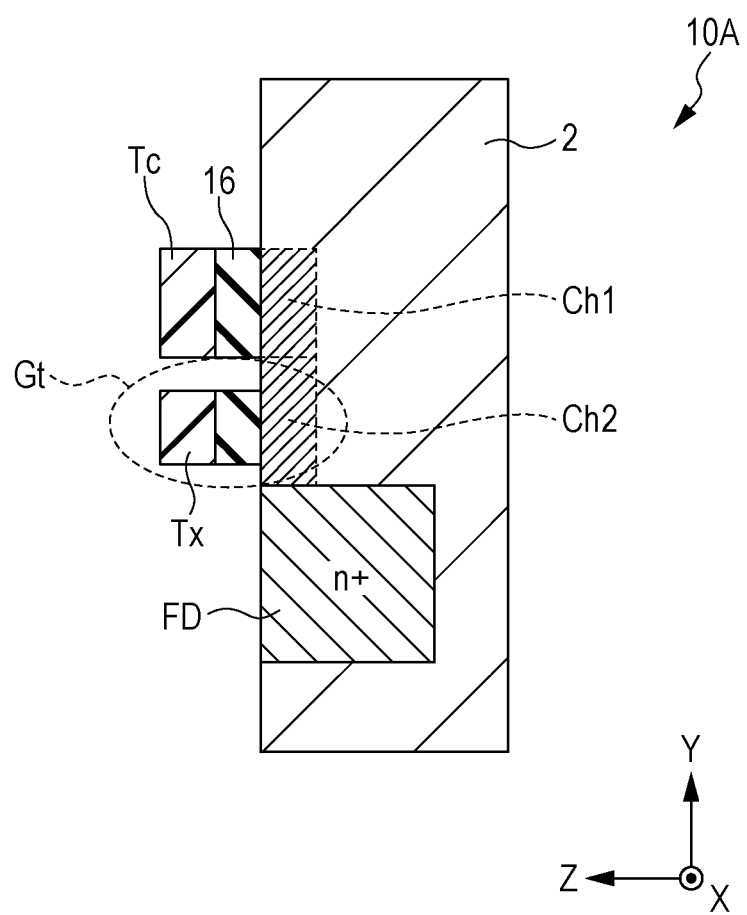
FIG. 3 is a sectional view taken along line III-III shown in FIG. 1.

FIGS. 1 to 3 schematically show an example of the pixel structure of an imaging device according to a first embodiment of the present disclosure. FIG. 1 schematically shows the disposition of elements forming a pixel when seen from the direction of a normal to the imaging surface. FIGS. 2 and 3 schematically show sections taken along line II-II and line III-III, respectively, in FIG. 1. FIGS. 1 to 3 also show arrows representing mutually perpendicular X, Y, and Z directions for reference. The Z direction is the direction of a normal to the imaging surface. Other drawings may also show arrows representing the X, Y, and/or Z directions.

A pixel 10A shown in FIGS. 1 to 3 includes a photoelectric conversion unit 12, a drain 14, and a charge accumulation unit FD (also referred to as a charge accumulator). Note that FIGS. 1 to 3 are schematic views for explanation and therefore do not necessarily reflect the real sizes. Similarly, the sizes of elements in other drawings may not match the real sizes thereof.

The photoelectric conversion unit 12 includes a photoelectric conversion element (also referred to as a photoelectric converter) that can receive incoming light and generate charge (hereafter may be referred to as "signal charge"). In this example, a photodiode is used as the photoelectric conversion element. Hereafter, the photoelectric conversion unit 12 will be referred to as "photodiode 12" for convenience.

As shown in FIGS. 2 and 3, in this example, the photodiode 12, drain 14 and charge accumulation unit FD are formed in a semiconductor substrate 2, such as a silicon (Si) substrate. The semiconductor substrate 2 need not be a substrate which is entirely formed of a semiconductor and may be, for example, an insulating substrate having a semiconductor layer on a surface thereof on which a photosensitive region is to be formed. In this example, a p-type silicon substrate is used as the semiconductor substrate 2. In this example, the photodiode 12 is formed by forming an impurity region (an n-type region) in the p-type silicon substrate. In this example, the drain 14 and charge accumulation unit FD are impurity regions (n-type regions) formed in the p-type silicon substrate.

Although not shown in FIGS. 1 to 3, the elements other than the photodiode 12 of the pixel 10A are covered by a light-shielding layer. For example, this light-shielding layer may be disposed on an interlayer insulating layer that is formed on the semiconductor substrate 2 so as to cover the drain 14 and charge accumulation unit FD. The light-shielding layer may also be a wiring layer disposed over the semiconductor substrate 2. A control electrode Tc and a transfer gate electrode Tx (to be discussed later) may constitute part of the light-shielding layer.

The drain 14 is connected to a power supply line 24 connected to a power supply (not shown). During the operation of the imaging device, the drain 14 receives the supply of a predetermined voltage Vdr through the power supply line 24 and thus the potential thereof is fixed. Note that lines, such as the power supply line 24, may not be shown in drawings other than plan views to avoid the complication of the drawings.

In the configuration shown in FIGS. 1 to 3, the photodiode 12 and drain 14 are spaced from each other in the X direction. As will be described later in detail, for example, when the potential of the drain 14 is fixed to a predetermined potential during the operation of the imaging device, signal charge generated by the photodiode 12 moves through the semiconductor substrate 2 from the photodiode 12 toward the drain 14. That is, the region between the photodiode 12 and drain 14 in the semiconductor substrate 2 serves as a charge transfer channel Ch1 that transfers the charge generated in the photodiode 12. As seen above, the pixel 10A includes the charge transfer channel Ch1 connecting the photodiode 12 and drain 14. While the charge transfer channel Ch1 is linear in this example, the shape of the charge transfer channel Ch1 may have other shapes. For example, the charge transfer channel Ch1 may include a bend and/or curve. The charge transfer channel Ch1 continuously transfers signal charge generated by the photodiode 12 toward the drain 14. As used herein, the term "continuously transfer" refers to continuously transferring the signal charge to the terminating end of the channel without temporarily accumulating it in the charge accumulation unit or the like midway along the channel.

In this example, as shown in FIG. 2, an insulating layer 16 and a control electrode Tc are stacked on the region between the photodiode 12 and drain 14 in the semiconductor substrate 2. That is, in this example, in the pixel 10A, the control electrode Tc is disposed over the charge transfer channel Ch1 so as to extend along the charge transfer channel Ch1. The control electrode Tc is typically formed of polysilicon which is doped with an impurity and thus has conductivity. The insulating layer 16 is, for example, a silicon dioxide layer.

As shown in FIG. 1, power supply lines 21 and 22 connected to a power supply (not shown) are connected to portions of the control electrode Tc near the edges adjacent to the photodiode 12 and drain 14, respectively, of the control electrode Tc. Thus, by controlling the potential of the control electrode Tc through the power supply lines 21 and 22, an inversion layer can be formed in the region between the photodiode 12 and drain 14. This inversion layer serves as a channel for transferring the signal charge generated by the photodiode 12 to the drain 14. That is, the charge transfer channel Ch1 may be an inversion layer formed in the semiconductor substrate 2.

Since, in this example, the power supply lines 21 and 22 is connected to the control electrode Tc, a first voltage V1 and a second voltage V2 can be supplied to the edges adjacent to the photodiode 12 and drain 14, respectively, thereof. The first voltage V1 and second voltage V2 are typically different voltages. The potential gradient of the charge transfer channel Ch1 can be controlled by independently applying the first voltage V1 and second voltage V2 to both ends of the control electrode Tc through the power supply lines 21 and 22. As will be described later, in the pixel 10A, the signal charge generated by the photodiode 12 is moved toward the drain 14 by controlling the potential gradient of the charge transfer channel Ch1. The first voltage V1 and second voltage V2 may be the same voltage as long as the signal charge generated by the photodiode 12 can be moved toward the drain 14.

As shown in FIGS. 1 and 3, the charge accumulation unit FD is spaced from the charge transfer channel Ch1 along the Y direction. The charge accumulation unit FD serves as a storage for temporarily accumulating signal charge. As shown in these figures, in this example, the transfer gate electrode Tx is disposed between the charge transfer channel Ch1 and charge accumulation unit FD. The transfer gate electrode Tx is formed of a metal such as aluminum or copper, a metal nitride, or polysilicon. As shown in FIG. 3, the transfer gate electrode Tx is formed on the insulating layer 16 formed on the semiconductor substrate 2.

Connected to the transfer gate electrode Tx is a gate control line 26 connected to a voltage supply circuit (to be discussed later). The potential of the transfer gate electrode Tx is controlled by a gate control voltage Vt supplied from the voltage supply circuit through the gate control line 26. For example, by raising the gate control voltage Vt supplied to the transfer gate electrode Tx to a high level, an inversion layer can be formed in the region between the charge transfer channel Ch1 and the charge accumulation unit FD in the semiconductor substrate 2. By forming an inversion layer in the region between the charge transfer channel Ch1 and the charge accumulation unit FD, it is possible to form a channel for moving charge between the charge transfer channel Ch1 and charge accumulation unit FD. By forming a channel between the charge transfer channel Ch1 and charge accumulation unit FD, it is possible to transfer at least part of the signal charge moving through the charge transfer channel Ch1 toward the charge accumulation unit FD.

That is, the pixel 10A includes a charge transfer channel Ch2 for transferring charge moving through the charge transfer channel Ch1 to the charge accumulation unit FD. The charge transfer channel Ch2 can be said to be a channel diverging from the charge transfer channel Ch1. The charge accumulation unit FD accumulates charge transferred through the charge transfer channel Ch2.

By lowering the gate control voltage Vt supplied to the transfer gate electrode Tx to a low level, the transfer of charge from the charge transfer channel Ch1 to the charge accumulation unit FD is stopped. In this example, the region between the charge transfer channel Ch1 and charge accumulation unit FD in the semiconductor substrate 2, and the insulating layer 16 and transfer gate electrode Tx on the region constitute a gate Gt for switching between the transfer and non-transfer of charge to the charge accumulation unit FD through the charge transfer channel Ch2. As described above, the open and close of the gate Gt are controlled using the gate control voltage Vt. That is, in this example, the open and close of the charge transfer channel Ch2 are electrically controlled.

The charge accumulation unit FD has a function of temporarily accumulating signal charge transferred from the charge transfer channel Ch1. As shown in FIG. 1, the charge accumulation unit FD is connected to a read line 28. As will be described later, the read line 28 is connected to a signal detection circuit including an amplifier transistor or the like, and a signal corresponding to the amount of charge accumulated in the charge accumulation unit FD is read through the signal detection circuit.

The pixel 10A can be produced using a known semiconductor process. Note that it is useful that the surface of the semiconductor substrate 2 on the insulating layer 16 side is not silicided. In particular, it is useful that a region corresponding to the charge transfer channel Ch1 and a region (typically, a diffusion layer) corresponding to the charge transfer channel Ch2 in the semiconductor substrate 2 is not silicided. By avoiding the region corresponding to the charge transfer channel Ch1 and the region corresponding to the charge transfer channel Ch2 in the semiconductor substrate 2 from being silicided, it is possible to suppress the entry of noise resulting from the presence of a metal. It is also possible to suppress variations in the mobility of the signal charge when the signal charge moves preferentially through a silicide and thus to make the resistance of the channel uniform.

Figure 4:
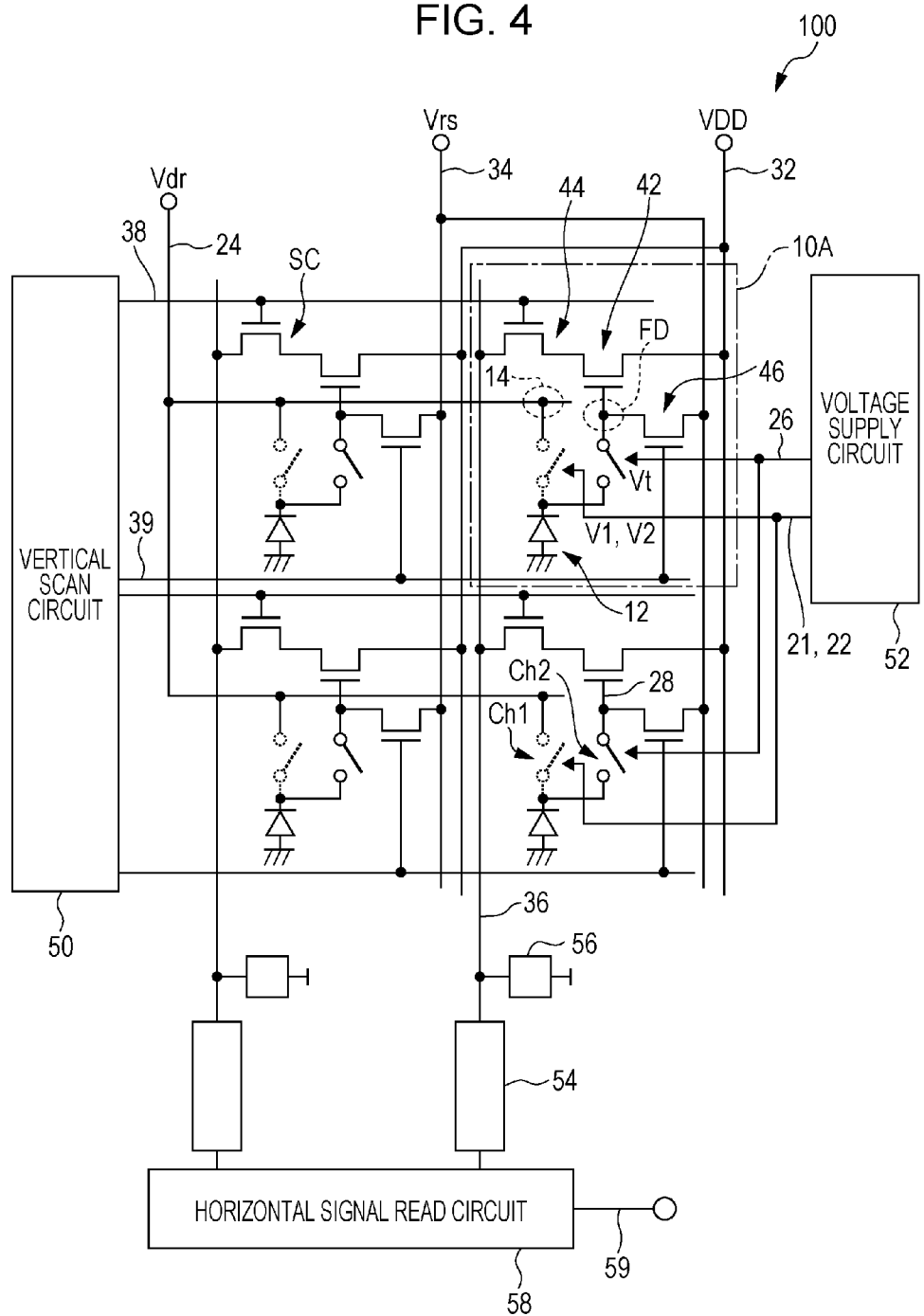
FIG. 4 is a schematic view of an example circuit configuration of the imaging device of the first embodiment of the present disclosure.

Refer to FIG. 4. FIG. 4 schematically shows an example circuit configuration of the imaging device of the first embodiment of the present disclosure. An imaging device 100 shown in FIG. 4 includes the pixel 10A described with reference to FIGS. 1 to 3 and peripheral circuits. FIG. 4 shows four pixels 10A arranged in a two-row, two-column matrix. However, this is illustrative only, and the number and disposition of pixels 10A are not limited to those shown in FIG. 4. The pixels 10A form a photosensitive region (pixel region), for example, by arranging them two-dimensionally. Every two adjacent pixels 10A are electrically separated by an element separation region [a p-type region (not shown)] formed on the semiconductor substrate 2. The pixels 10A may be arranged one-dimensionally.

In the configuration shown in FIG. 4, the imaging device 100 includes, as peripheral circuits, a vertical scan circuit (also referred to as "row scan circuit") 50, a voltage supply circuit 52, column signal processing circuits (also referred to as "row signal accumulation circuits") 54 disposed for the respective columns of the pixel array, load circuits 56 disposed for the respective columns of the pixel array, and a horizontal signal read circuit (also referred to as "column scan circuit") 58.

In this example, the voltage supply circuit 52 supplies the first voltage V1 and second voltage V2, which are used to control the potential gradient of the charge transfer channel Ch1, through the power supply lines 21 and 22. In this example, the voltage supply circuit 52 also supplies the gate control voltage Vt, which is used to control the start and stop of the transfer of signal charge from the charge transfer channel Ch1 to the charge accumulation unit FD through the charge transfer channel Ch2. The voltage supply circuit 52 may be configured in any manner as long as it can supply a predetermined voltage at a predetermined timing. The voltage supply circuit 52 may also be part of the vertical scan circuit 50. That is, at least one of the first voltage V1, second voltage V2, and gate control voltage Vt may be supplied from the vertical scan circuit 50 to each pixel 10A.

Each pixel 10A is connected to a power supply line 32 through which a power supply voltage VDD is supplied. Each pixel 10A is also connected to a reset voltage line 34 that supplies a reference voltage Vrs used to reset the charge accumulation unit FD and a power supply line 24 that supplies a predetermined voltage to each drain 14.

In the configuration shown in FIG. 4, each pixel 10A includes the photoelectric conversion unit 12, drain 14, and charge accumulation unit FD, as well as an amplifier transistor 42, an address transistor 44, and a reset transistor 46. The amplifier transistor 42, address transistor 44, and reset transistor 46 are typically field-effect transistors (FETs). In this example, n-channel MOS transistors are used as the amplifier transistor 42, address transistor 44, and reset transistor 46.

In the configuration shown in FIG. 4, the control terminal (the gate) of the amplifier transistor 42 is connected to the read line 28 connected to the charge accumulation unit FD. One (the drain) of the input and output terminals of the amplifier transistor 42 is connected to the power supply line 32. The other (the source) of the input and output terminals of the amplifier transistor 42 is connected to one (the drain) of the input and output terminals of the address transistor 44. The other (the source) of the input and output terminals of the address transistor 44 is connected to a corresponding vertical signal line 36.

The control terminal (the gate) of the address transistor 44 is connected to a corresponding address signal line 38. In this example, the address signal line 38 is connected to the vertical scan circuit 50. The gate of the address transistor 44 receives a row selection signal for controlling on and off of the address transistor 44 from the vertical scan circuit 50 through the address signal line 38. When the vertical scan circuit 50 sends row selection signals to the respective address signal lines 38, rows to be read are scanned and selected. Signal voltages are read from pixels 10A in a selected row into corresponding vertical signal lines 36. That is, in this example, each amplifier transistor 42 and address transistor 44 constitute a signal detection circuit SC. The signal detection circuit SC may include other elements, such as a capacitor.

As shown in FIG. 4, in this example, the vertical scan circuit 50 is also connected to reset signal lines 39. Each reset signal line 39 is connected to the control terminals (the gates) of corresponding reset transistors 46. One (the drain) of the input and output terminals of each reset transistor 46 is connected to a reset voltage line 34 that supplies a predetermined reference voltage Vrs. The other terminal is connected to the read line 28 connected to the charge accumulation unit FD. The vertical scan circuit 50 supplies a reset signal for controlling on and off of the reset transistor 46 to each reset transistor 46 through a corresponding reset signal line 39. Thus, the vertical scan circuit 50 can select pixels 10A on a row basis and reset the potentials of the charge accumulation units FD thereof by supplying reset signals to the pixels 10A through a corresponding reset signal line 39.

The pixels 10A are connected to the vertical signal lines 36, which are disposed so as to correspond to the respective columns. A load circuit 56 is electrically connected to each vertical signal line 36, and the load circuit 56 and a corresponding amplifier transistor 42 constitute a source follower circuit. Each vertical signal line 36 is electrically connected to a corresponding column signal processing circuit 54, which performs noise suppression signal processing typified by correlated double sampling, analog-digital conversion (AD conversion), or the like. The horizontal signal read circuit 58 is electrically connected to each column signal processing circuit 54. The horizontal signal read circuit 58 sequentially reads signals from the multiple column signal processing circuits 54 into a horizontal common signal line 59.

The amplifier transistors 42, address transistors 44, and reset transistors 46 may be n-channel MOS transistors or p-channel MOS transistors. But, all these transistors need not be either of n-channel MOS transistors and p-channel MOS transistors.

Signal Detection Operation of Pixel 10A

Figure 5:
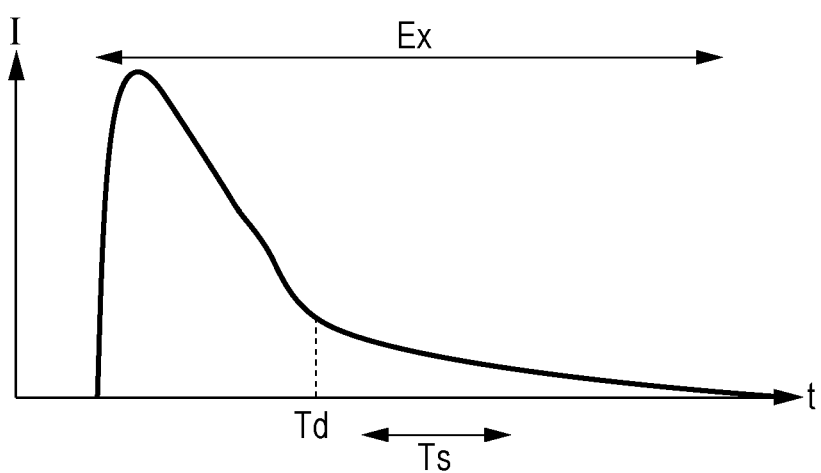
FIG. 5 is a diagram showing an example of temporal variations in the strength of light that enters a photodiode.
Figure 6:
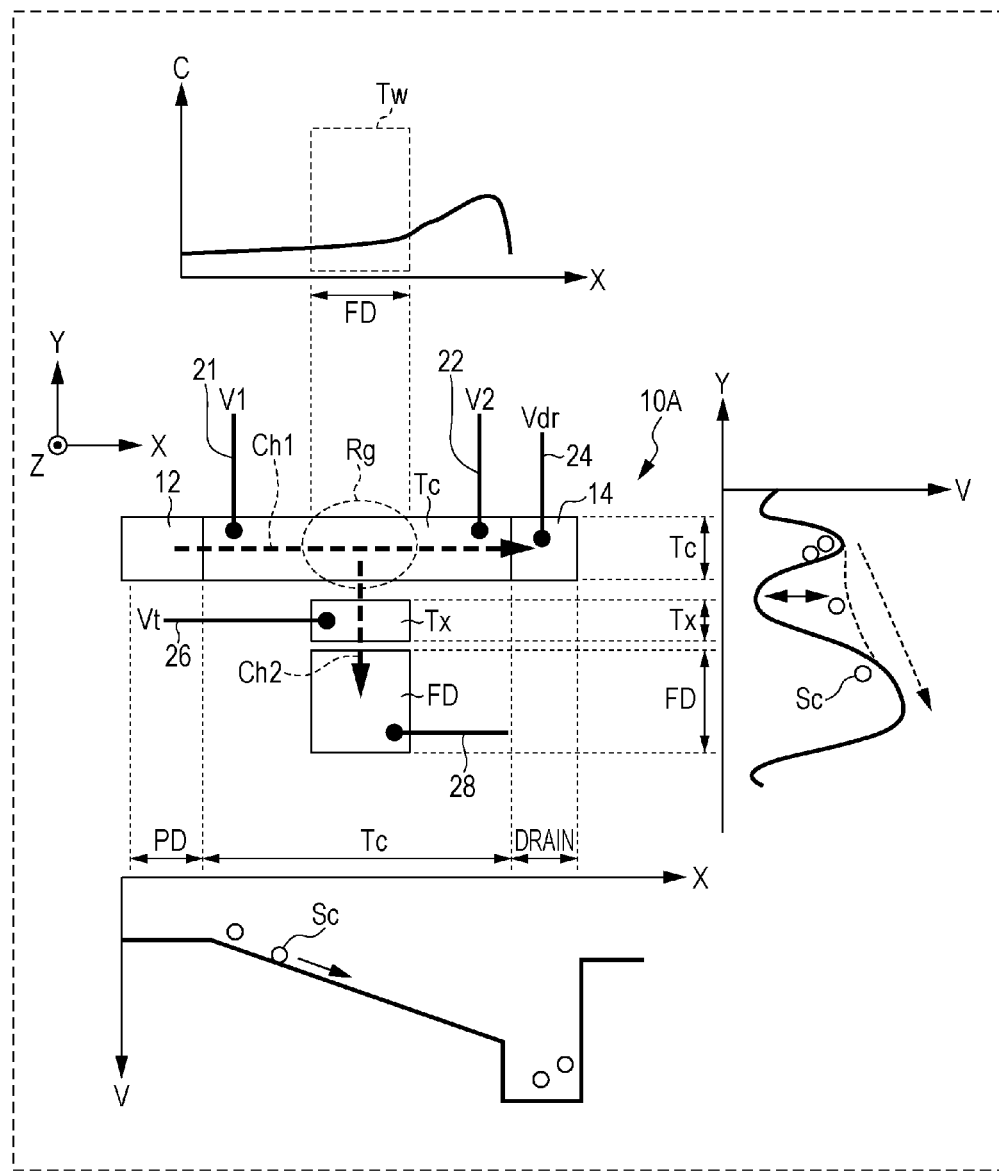
FIG. 6 is a diagram collectively showing a plan view of a pixel, an example of the distribution of signal charge in a charge transfer channel at a certain time, and an example of the potential in a semiconductor substrate.

Next, referring to FIGS. 5 and 6, an example of the signal detection operation of a pixel 10A will be described. FIG. 5 shows an example of temporal variations in the strength I of light that enters a photodiode 12. In FIG. 5, the horizontal axis represents the time t, and an arrow Ex schematically shows the time period during which the photodiode 12 is exposed. FIG. 6 collectively shows a plan view of the pixel 10A, an example of the distribution of signal charge in the charge transfer channel Ch1 at a certain time, and an example of the potential in the semiconductor substrate 2. The vertical axis of a graph shown in an upper part of FIG. 6 represents the amount of charge C.

In FIG. 6, the charge transfer channel Ch1 connecting the photodiode 12 and drain 14 is shown by a thick broken-line arrow. Also, in FIG. 6, the charge transfer channel Ch2 is shown by a thick broken-line arrow extending along the Y direction. Similarly, the charge transfer channel Ch1 or charge transfer channel Ch2 may be shown by a thick broken-line arrow in other drawings.

An example in which electrons are used as signal charge will be described below. Of course, positive holes may be used as signal charge.

Before detecting light, the charge accumulation unit FD is reset by turning on and then turning off the reset transistor 46. A relatively high voltage Vdr is applied to the drain 14 through the power supply line 24. Further, the first voltage V1 and second voltage V2 are applied to the end adjacent the photodiode 12, of the control electrode Tc and to the end adjacent the drain 14 thereof, respectively, through the power supply lines 21 and 22. At this time, the first voltage V1 and second voltage V2 satisfying a relationship Vdr>V2>V1 are applied to the control electrode Tc.

A lower portion of FIG. 6 shows an example of variations in potential in the semiconductor substrate 2 along the X direction in a state in which the voltage Vdr, first voltage V1 and second voltage V2 are being applied. A right portion of FIG. 6 shows, using a solid line, an example of variations in potential in the semiconductor substrate 2 along the Y direction in a state in which the voltage Vdr, first voltage V1 and second voltage V2 are being applied. White circles Sc in these graphs schematically show signal charge.

Attention is paid to variations in the energy of the signal charge (electrons) along the X direction. In this example, the energy of the signal charge (electrons) is highest near the photodiode 12 and is lower in locations closer to the drain 14. Accordingly, during the application of the voltage Vdr, first voltage V1, and second voltage V2, the signal charge (electrons) generated in the photodiode 12 moves through the charge transfer channel Ch1 toward the drain 14. The signal charge reaches the drain 14 and is released from the pixel 10A. The state in which the voltage Vdr, first voltage V1 and second voltage V2 are being applied can be said to be a state in which the photodiode 12 is being reset.

Here, it is assumed that light indicating temporal variations as shown in FIG. 5 enters the photodiode 12. As described above, in a state in which the voltage Vdr, first voltage V1 and second voltage V2 are being applied, a potential gradient is being formed in the charge transfer channel Ch1. Accordingly, signal charge generated in the photodiode 12 moves toward the drain 14.

Since the strength I of light entering the photodiode 12 temporally varies, the amount of signal charge generated in the photodiode 12 also temporally varies with the temporal variations in the strength I of the entering light. Accordingly, the amount of signal charge flowing into the charge transfer channel Ch1 also varies with the temporal variations in the strength I of the entering light. That is, the amount of signal charge passing through a contain point of the charge transfer channel Ch1 temporally varies with the temporal variations in the strength I of the entering light. In other words, the amount of signal charge in the charge transfer channel Ch1 when a certain time Td passes after the start of the entry of light into the photodiode 12 shows a distribution corresponding to the temporal variations in the strength I of the entering light, as schematically shown in an upper portion of FIG. 6. The reason is that, from a broad view, the traveling distance in the charge transfer channel Ch1, of signal charge that has flown into the charge transfer channel Ch1 at a certain time is longer than the traveling distance of signal charge that has flown into the charge transfer channel Ch1 at a time later than that time.

As seen above, the amount of signal charge in the charge transfer channel Ch1 at time Td shows a distribution as shown by a schematic graph in the upper portion of FIG. 6.

Here, it is assumed that, at time Td, the gate control voltage Vt applied to the transfer gate electrode Tx is raised to a high level. By raising the gate control voltage Vt to a high level, the potential barrier between the charge transfer channel Ch1 and charge accumulation unit FD is lowered, as shown by a broken line in a graph in the right portion of FIG. 6. Thus, the gate Gt (see FIG. 3) between the charge transfer channel Ch1 and charge accumulation unit FD is opened.

By opening the gate Gt, signal charge traveling around a region Rg overlapping the transfer gate electrode Tx in the Y direction, of the signal charge traveling the charge transfer channel Ch1 is selectively transferred to the charge accumulation unit FD through the charge transfer channel Ch2. After a time period Ts (see FIG. 5) has elapsed after time Td, the gate control voltage Vt is lowered to a low level to close the gate Gt. By closing the gate Gt, the transfer of the signal charge to the charge accumulation unit FD is ended.

As seen above, by disposing the charge accumulation unit FD midway along the charge transfer channel Ch1 and controlling the open and close of the gate Gt between the charge transfer channel Ch1 and charge accumulation unit FD, part of the signal charge moving through the charge transfer channel Ch1 can be selectively extracted and put into the charge accumulation unit FD. The amount of signal charge transferred and accumulated in the charge accumulation unit FD has information corresponding to the amount of light that has entered the photodiode 12 during the time period Ts in the entire time period during which the photodiode 12 has been exposed (the time period shown by the arrow Ex in FIG. 5). That is, by reading the charge accumulated in the charge accumulation unit FD, detection is performed in a time window Tw having time Td as the start point and corresponding to the time period Ts.

While the conventional method involves transferring all signal charge generated in a photodiode to floating diffusion and reading the transferred signal, the above illustrative operation involves extracting part of the signal charge moving through the charge transfer channel Ch1 toward the drain 14 and accumulating it in the charge accumulation unit FD. Accordingly, the time period required to reset the photodiode 12 is substantially zero, and the time period required to accumulate the signal charge is not the entire exposure period but part thereof. Thus, the imaging device can operate at higher speed.

Further, in the present embodiment, the open and close of the gate Gt can be electrically controlled, for example, using the gate control voltage Vt. By controlling the timing at which the gate Gt is opened or closed, it is possible to extract part of the signal charge moving through the charge transfer channel Ch1 toward the drain 14 at any start time and over any length of period and to accumulate it in the charge accumulation unit FD. That is, part of the signal charge can be sampled in the desired time window. The time window for detection can be adjusted, for example, using the distance Ld from the photodiode 12 to the charge accumulation unit FD or transfer gate electrode Tx in the direction along the charge transfer channel Ch1, the length (width) Lw of the charge accumulation unit FD or transfer gate electrode Tx in the direction along the charge transfer channel Ch1, or the like (see FIG. 1).

In the illustrative operation, different voltages are applied to both ends of the control electrode Tc. However, assuming that electrons are used as signal charge, if the potential of the drain 14 is higher than the potential of the photodiode 12, the signal charge can move from the photodiode 12 toward the drain 14. For this reason, the same voltage may be applied to both ends of the control electrode Tc. Note that by independently applying different voltages to both ends of the control electrode Tc, it is possible to control the magnitude of the potential gradient in the charge transfer channel Ch1 between the photodiode 12 and drain 14 through the insulating layer 16 under the control electrode Tc. Thus, the transfer speed of the signal charge from the photodiode 12 to the drain 14 can be electrically controlled. For example, assuming that the above detection operation is performed repeatedly, the potential gradient of the charge transfer channel Ch1 may be changed each time the photodiode 12 is reset so that signal charge moving at a different transfer speed is extracted and put into the charge accumulation unit FD. The first voltage V1 and second voltage V2 applied to the control electrode Tc may be, for example, high-level and low-level digital signals, or analog voltages having any magnitude.

Figure 7:
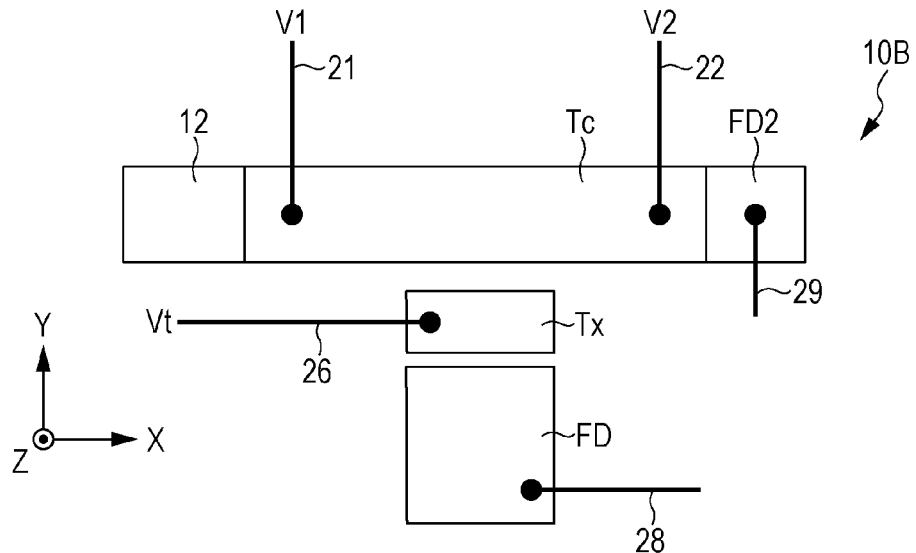
FIG. 7 is a schematic plan view of an imaging device of another example of the first embodiment of the present disclosure.

Another charge accumulation unit may be disposed on the drain 14, or a second charge accumulation unit FD2 may be disposed at the terminating end of the charge transfer channel Ch1 in place of the drain 14, as in a pixel 10B shown in FIG. 7. The second charge accumulation unit FD2 accumulates at least part of the charge transferred through the charge transfer channel Ch1. In the configuration shown in FIG. 7, a read line 29 is connected to the second charge accumulation unit FD2. The read line 29 can be connected to a signal detection circuit independent of the signal detection circuit connected to the charge accumulation unit FD through the read line 28.

In a configuration in which charge accumulation units are disposed at the terminating end of a charge transfer channel Ch1 and at a portion other than the terminating end, as shown in FIG. 7, the open and close of a gate disposed between the charge accumulation unit (the charge accumulation unit FD in FIG. 7) disposed at the portion other than the terminating end of the charge transfer channel Ch1 and the charge transfer channel Ch1 may be controlled. By controlling the period during which the gate is opened, charge can be distributed to the two charge accumulation units (the charge accumulation units FD and FD2 in FIG. 7) at any ratio.

Second Embodiment

Figure 8:
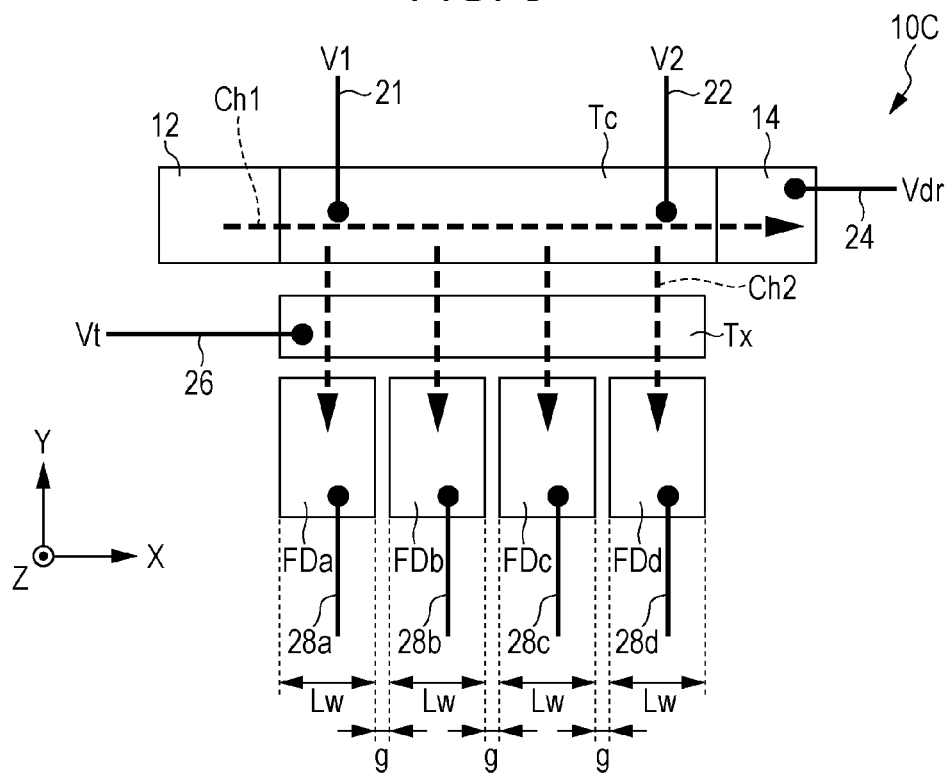
FIG. 8 is a schematic plan view of an imaging device of a second embodiment of the present disclosure.

FIG. 8 schematically shows an example of the pixel structure of an imaging device according to a second embodiment of the present disclosure. A pixel 10C shown in FIG. 8 differs from the pixel 10A shown in FIG. 1 in that the pixel 10C includes multiple charge accumulation units disposed along a charge transfer channel Ch1.

In the configuration shown in FIG. 8, four charge accumulation units, FDa to FDd, each having a length Lw in the X direction are disposed at intervals of g along the X direction. The number of the charge accumulation units, the length (width) of each charge accumulation unit in the direction along the charge transfer channel Ch1, and the distance between adjacent two charge accumulation units shown in FIG. 8 are illustrative only. For example, the number of charge accumulation units in each pixel is not limited to four, and the multiple charge accumulation units may have different widths, or the distances between the charge accumulation units may be different.

In the configuration shown in FIG. 8, a single transfer gate electrode Tx is disposed between the charge transfer channel Ch1 and the charge accumulation units FDa to FDd. In this example, the transfer gate electrode Tx extends from the left edge of the charge accumulation unit FDa to the right edge of the charge accumulation unit FDd along the X direction. That is, the length (width) of the transfer gate electrode Tx in the X direction is (4Lw+3g).

As will be described later, by raising the potential of the transfer gate electrode Tx to a high level, the gate between the charge transfer channel Ch1 and the charge accumulation units FDa to FDd can be opened. By opening the gate between the charge transfer channel Ch1 and the charge accumulation units FDa to FDd, signal charge moving through the charge transfer channel Ch1 can be transferred to the charge accumulation units FDa to FDd. That is, since the pixel 10C has the four charge accumulation units, FDa to FDd, it also has four charge transfer channels Ch2 that transfer charge from the charge transfer channel Ch1 toward the charge accumulation units.

Read lines 28a to 28d are connected to the charge accumulation units FDa to FDd, respectively. The read lines 28a to 28d are connected to a signal detection circuit SC (see FIG. 4) including an amplifier transistor 42 and the like. Accordingly, the signal charge accumulated in the charge accumulation units FDa to FDd can be read independently.

Signal Detection Operation of Pixel 10C

Figure 9:
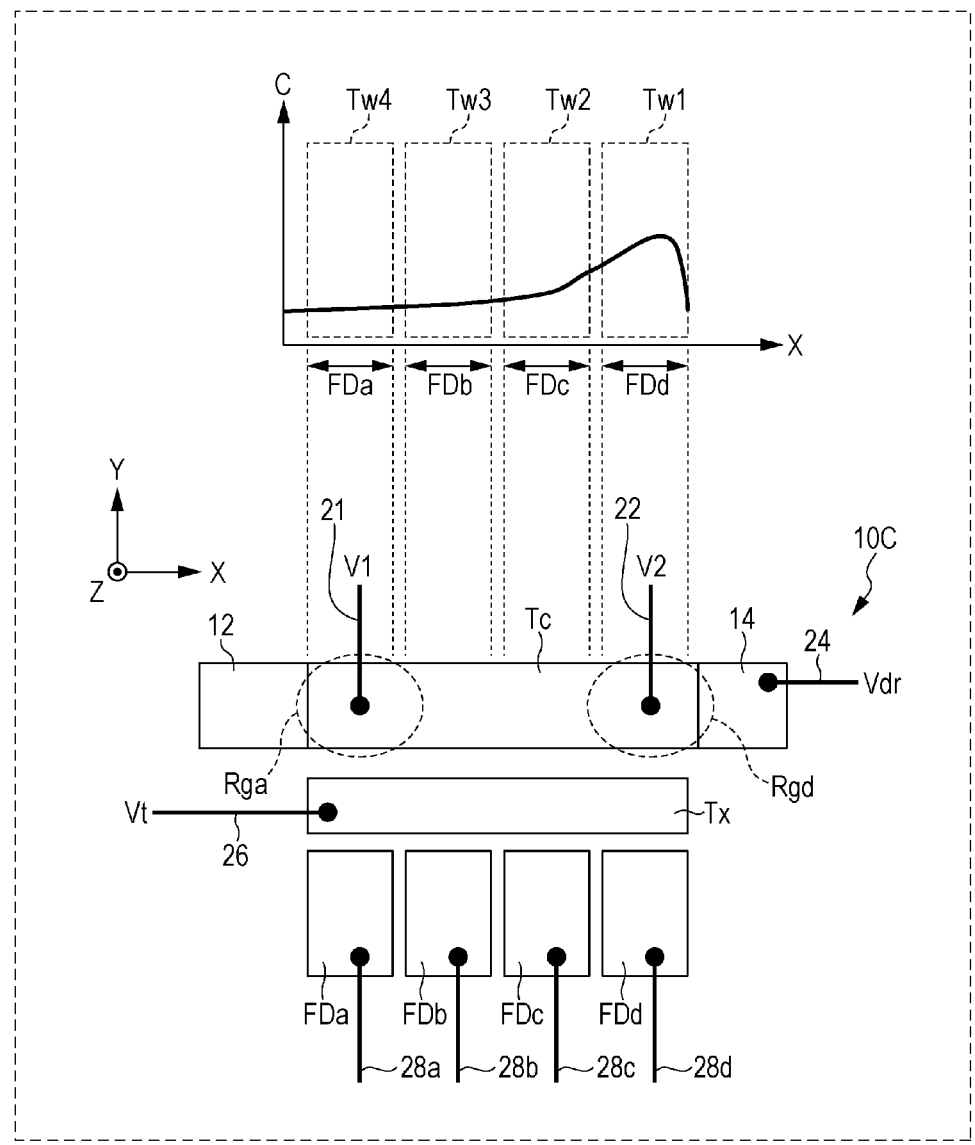
FIG. 9 is a diagram collectively showing a plan view of a pixel and an example of the distribution of signal charge in a charge transfer channel at a certain time according to the second embodiment.
Figure 11A:
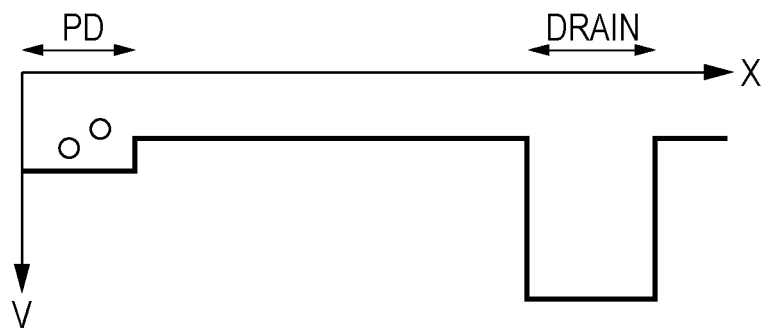
FIG. 11A is a diagram showing an example of variations in potential in a semiconductor substrate along the X direction at a first time shown in FIG. 10.
Figure 11B:
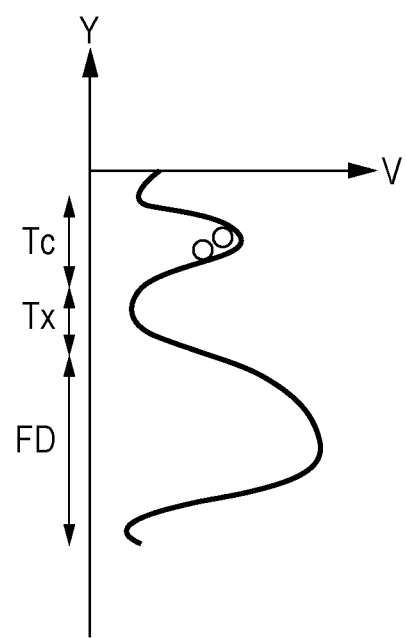
FIG. 11B is a diagram showing an example of variations in the potential in the semiconductor substrate along the Y direction at the first time shown in FIG. 10.
Figure 12A:
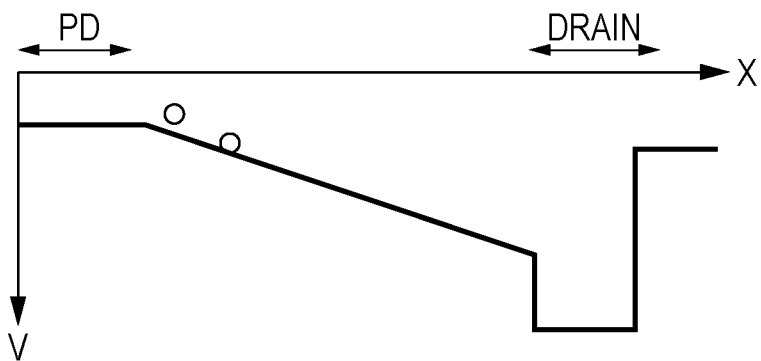
FIG. 12A is a diagram showing an example of variations in potential in the semiconductor substrate along the X direction at a second time shown in FIG. 10.
Figure 12B:
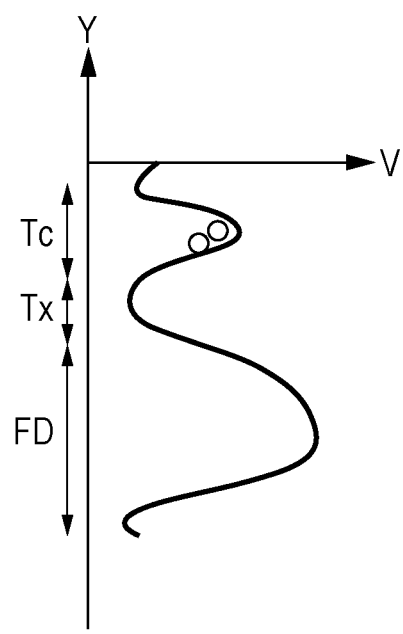
FIG. 12B is a diagram showing an example of variations in potential in the semiconductor substrate along the Y direction at the second time shown in FIG. 10.
Figure 13A:
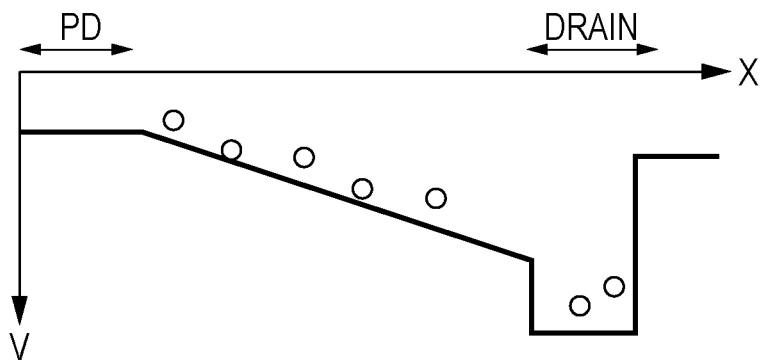
FIG. 13A is a diagram showing an example of variations in potential in the semiconductor substrate along the X direction at a third time shown in FIG. 10.
Figure 13B:
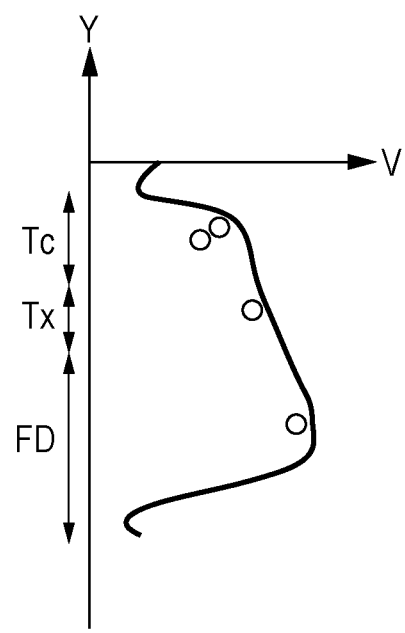
FIG. 13B is a diagram showing an example of variations in potential in the semiconductor substrate along the Y direction at the third time shown in FIG. 10.

Next, referring to FIGS. 9 to 13B, an example of the signal detection operation of the pixel 10c will be described. FIG. 9 collectively shows a plan view of the pixel 10C and an example of the distribution of signal charge in the charge transfer channel Ch1 at a certain time. FIG. 10 is a timing chart showing an example of a first voltage V1 and a second voltage V2 applied to a control electrode Tc and an example of a gate control voltage Vt applied to the transfer gate electrode Tx. FIG. 11A shows an example of variations in potential in a semiconductor substrate 2 along the X direction at time T1 shown in FIG. 10, and FIG. 11B shows an example of variations in potential in the semiconductor substrate 2 along the Y direction at time T1 shown in FIG. 10. FIG. 12A shows an example of variations in potential in the semiconductor substrate 2 along the X direction at time T2 shown in FIG. 10, and FIG. 12B shows an example of variations in potential in the semiconductor substrate 2 along the Y direction at time T2 shown in FIG. 10. FIG. 13A shows an example of variations in potential in the semiconductor substrate 2 along the X direction at time T3 shown in FIG. 10, and FIG. 13B shows an example of variations in potential in the semiconductor substrate 2 along the Y direction at time T3 shown in FIG. 10.

Before detecting light, the charge accumulation units FDa to FDd are reset. For example, reset transistors in a signal read circuit connected to the read lines 28a to 28d are turned on and then turned off. At this point in time, the first voltage V1, second voltage V2, and gate control voltage Vt are all a low level (time T1 in FIG. 10).

Then, the first voltage V1 and second voltage V2 are raised to high levels. At this time, voltages Vdr, V1, and V2 satisfying a relationship Vdr>V2>V1 are applied to the power supply lines 24, 21, and 22, respectively. Thus, a potential gradient as shown in a lower portion of FIG. 12A is formed in the charge transfer channel Ch1. When light enters a photodiode 12 in this state, the photodiode 12 generates signal charge, which then moves through the charge transfer channel Ch1 toward a drain 14. At this time, the speed at which the signal charge is transferred to the drain 14 can be adjusted by controlling the magnitude of the potential gradient.

Here, it is assumed that light indicating temporal variations as shown in FIG. 5 has entered the photodiode 12. As described with reference to FIGS. 5 and 6, if the strength of light entering the photodiode 12 temporally varies, the amount of signal charge passing through a certain point of the charge transfer channel Ch1 temporally varies with the temporal variations in the strength of the entering light. For this reason, the amount of signal charge in the charge transfer channel Ch1 when a certain time, Td, is reached after the start of the entry of light into the photodiode 12 shows a distribution corresponding to the temporal variations in the strength I of the entering light, as schematically shown in an upper portion of FIG. 9.

At time Td, the gate control voltage Vt applied to the transfer gate electrode Tx is raised to a high level. By raising the gate control voltage Vt to a high level, the potential barrier between the charge transfer channel Ch1 and the charge accumulation units FDa to FDd is lowered, as shown in FIG. 13B. That is, the gate between the charge transfer channel Ch1 and the charge accumulation units FDa to FDd is opened.

When the gate is opened, the signal charge moving through the charge transfer channel Ch1 is transferred to the charge accumulation units FDa to FDd through the charge transfer channel Ch2. At this time, the signal charge moving through the charge transfer channel Ch1 is transferred to one of the charge accumulation units FDa to FDd. To which of the charge accumulation units FDa to FDd the signal charge is transferred depends on the traveling distance of the signal charge at time Td of note. For example, at time Td, signal charge around a region Rga overlapping the charge accumulation unit FDa in the Y direction is transferred to the charge accumulation unit FDa, and signal charge around a region Rgd overlapping the charge accumulation unit FDd in the Y direction is transferred to the charge accumulation unit FDd (see FIG. 9). As seen above, by disposing the multiple charge accumulation units, FDa to FDd, along the charge transfer channel Ch1, the signal charge moving through the charge transfer channel Ch1 can be distributed to the charge accumulation units FDa to FDd in accordance with the traveling distance at the time point when the gate is opened.

As schematically shown by an upper portion of FIG. 9, the amount of signal charge in the charge transfer channel Ch1 at a certain time (e.g., time Td) shows a certain distribution. Accordingly, the amount of charge accumulated in the charge accumulation units FDa to FDd shows a distribution corresponding to the distribution of the signal charge in the charge transfer channel Ch1 at that time. This means that the signal charge resulting from entry of the light is detected by time-resolving it using time windows Tw1 to Tw4 shown by broken lines in a graph in the upper portion of FIG. 9.

For example, it takes 100 ps for signal charge (e.g., electrons) to move to a charge accumulation unit through a 4 μm-long charge transfer channel being subjected to the application of an electric field having a strength such that the saturation speed becomes 0.04 μm/ps. Accordingly, in a configuration in which signal charge is transferred directly to a charge accumulation unit through a 4 μm-long charge transfer channel, it takes 100 ps to simply transfer signal charge. In the configuration shown in FIGS. 8 and 9, on the other hand, the multiple charge accumulation units are disposed along the charge transfer channel having the drain disposed at the terminating end thereof, and electrons moving through the charge transfer channel are distributed to the multiple charge accumulation units. Thus, the temporal resolution can be improved. For example, by disposing four charge accumulation units along a 4 μm-long charge transfer channel, a temporal resolution of approximately 25 ps can be achieved even when the field strength is the same.

As seen above, in the second embodiment of the present disclosure, signal charge generated by the photoelectric conversion unit and being transferred to the drain is distributed to the multiple charge accumulation units in accordance with the traveling distance of the signal charge. Thus, the temporal resolution in detection can be improved without being limited by the saturation speed of the signal charge (e.g., electrons). If the above configuration, in which the signal charge is distributed to the multiple charge accumulation units in accordance with the traveling distance in the charge transfer channel, is applied, for example, to imaging using near infrared light, depth-direction information about the target to be measured can be obtained. In this case, by repeating the entry of light pulse and the cycle of the transfer and accumulation of signal charge described with reference to FIG. 9 and summing up the amount of charge in each charge accumulation unit, the SN ratio can be improved. The gate disposed on the charge transfer channel for transferring charge to the charge accumulation units may be opened at a predetermined timing each time light pulse is emitted.

The time window in detection can be controlled by adjusting the length (width) of each charge accumulation unit in the direction along the charge transfer channel CH1 or the distance between adjacent two charge accumulation units. For example, the lengths (width) of the charge accumulation units in the direction along the charge transfer channel Ch1 may be adjusted at a ratio corresponding to the desired temporal resolution ratio.

Positive holes may be used as signal charge in place of electrons. By using positive holes having relatively low mobility, signal charge can be favorably distributed to the adjacent charge accumulation units. That is, it is possible to suppress the entry of signal charge into not a charge accumulation unit to which the signal charge is to be transferred originally but another charge accumulation unit adjacent thereto.

In the configuration shown in FIG. 8, another charge accumulation unit may be disposed on the drain 14, or a second charge accumulation unit FD2 may be disposed at the terminating end of the charge transfer channel Ch1 in place of the drain 14, as in the pixel 10B shown in FIG. 7.

First Modification of Second Embodiment

Figure 14:
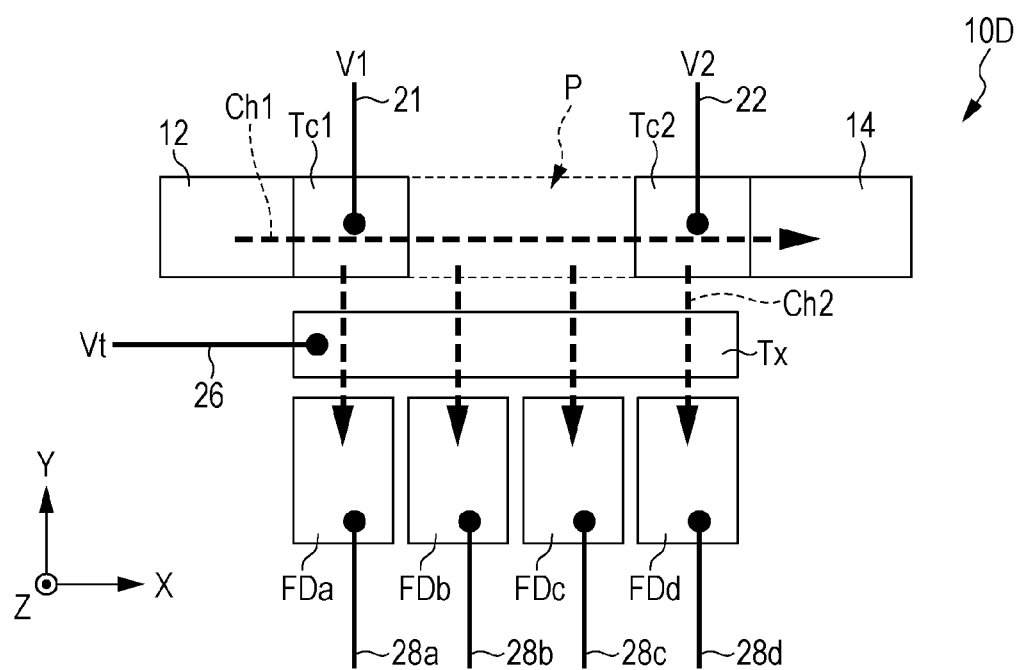
FIG. 14 is a schematic plan view showing an imaging device of another example of the second embodiment of the present disclosure.

FIG. 14 shows another example of the pixel according to the second embodiment of the present disclosure. A pixel 10D shown in FIG. 14 differs from the pixel 10C described with reference to FIG. 8 in that the pixel 10D includes a first control electrode Tc1 and a second control electrode Tc2 connected to power supply lines 21 and 22, respectively.

In the configuration shown in FIG. 14, a single control electrode is not disposed on the region between a photodiode 12 and a drain 14 in a semiconductor substrate 2 but rather the first control electrode Tc1 connected to the power supply line 21 and the second control electrode Tc2 connected to the power supply line 22 are disposed so as to be spaced from each other along a charge transfer channel Ch1. As shown in FIG. 14, the first control electrode Tc1 is disposed closer to the photodiode 12 than the second control electrode Tc2, and the second control electrode Tc2 is disposed closer to the drain 14 than the first control electrode Tc1.

As seen above, the control electrode that receives the supply of a first voltage V1 (the first control electrode Tc1) and the control electrode that receives the supply of a second voltage V2 (the second control electrode Tc2) may be separately disposed on the charge transfer channel Ch1. By separately disposing the electrode connected to the power supply line 21, which supplies the first voltage V1, and the electrode connected to the power supply line 22, which supplies the second voltage V2, it is possible to independently control the potentials of the first control electrode Tc1 and second control electrode Tc2. By independently controlling the potentials of the first control electrode Tc1 and second control electrode Tc2, the potentials of both ends of the charge transfer channel Ch1 can be controlled at higher speed. Note that in the configuration shown in FIG. 14, no electrode exists on the region between the first control electrode Tc1 and second control electrode Tc2 in the region between the photodiode 12 and drain 14. However, the potentials of both ends of the charge transfer channel Ch1 can be controlled and therefore signal charge can be moved toward the drain 14. The region between the first control electrode Tc1 and second control electrode Tc2 can be light-shielded by disposing a wiring layer or the like over that region.

In the configuration shown in FIG. 14, in which the first control electrode Tc1 and second control electrode Tc2 are disposed on the charge transfer channel Ch1, at least one of the first control electrode Tc1 and second control electrode Tc2 may be silicided. For example, in the configuration shown in FIG. 1, the power supply lines 21 and 22 are connected to the vicinities of both ends of the control electrode Tc extending along the charge transfer channel Ch1. If the control electrode Tc is silicided in this configuration, the required resistance value may not be obtained and thus a potential gradient having the desired magnitude may not be formed in the control electrode Tc in a direction extending along the charge transfer channel Ch1.

In the configuration shown in FIG. 14, on the other hand, even when at least one of the first control electrode Tc1 and second control electrode Tc2 is silicided, a potential gradient having the desired magnitude can be formed along the charge transfer channel Ch1. By siliciding at least one of the first control electrode Tc1 and second control electrode Tc2, it is possible to reduce the electrical resistance to improve the response speed to a variation in the potential of the power supply line. For example, at least one of the first control electrode Tc1 and second control electrode Tc2 may be formed from a metal or metal nitride.

Second Modification of Second Embodiment

Figure 15:
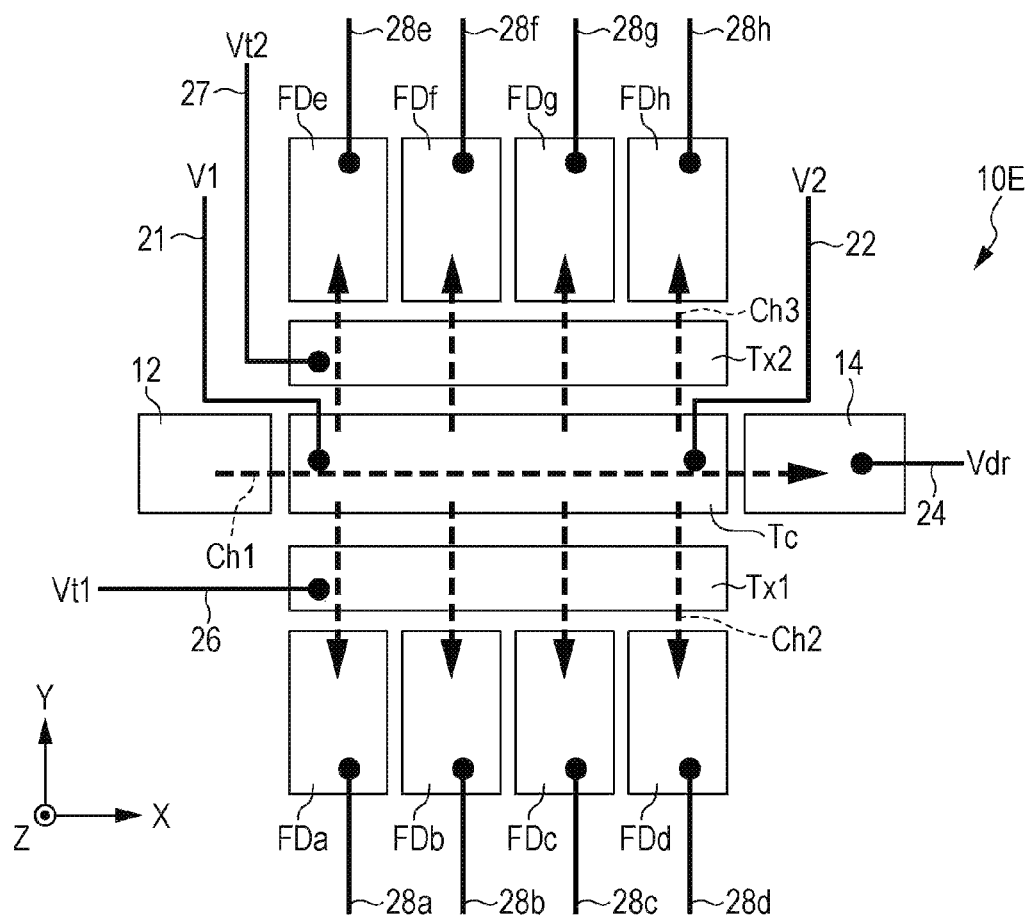
FIG. 15 is a schematic plan view of an imaging device of yet another example of the second embodiment of the present disclosure.

FIG. 15 shows yet another example of the pixel according to the second embodiment of the present disclosure. A pixel 10E shown in FIG. 15 differs from the pixel 10C described with reference to FIG. 8 in that the pixel 10E further includes four charge accumulation units, FDe to FDh, disposed along a charge transfer channel Ch1 so as to be opposed to charge accumulation units FDa to FDd with respect to the charge transfer channel Ch1.

In the configuration shown in FIG. 15, the charge accumulation units FDe to FDh are connected to read lines 28e to 28h, respectively. Signal detection circuits each including an amplifier transistor are connected to the read lines 28e to 28h. By connecting the charge accumulation units FDe to FDh to the read lines 28e to 28h, respectively, the accumulated signal charge can be independently read.

As shown in FIG. 15, a transfer gate electrode Tx1 connected to a gate control line 26 is disposed between the charge transfer channel Ch1 and the charge accumulation units FDa to FDd. By raising the gate control voltage Vt1 supplied to the gate control line 26 to a high level, the signal charge in the charge transfer channel Ch1 can be transferred to the charge accumulation units FDa to FDd through a charge transfer channel Ch2. On the other hand, a transfer gate electrode Tx2 connected to a gate control line 27 is disposed between the charge transfer channel Ch1 and the charge accumulation units FDe to FDh. By raising the gate control voltage Vt2 supplied to the gate control line 27 to a high level, the signal charge in the charge transfer channel Ch1 can be transferred to the charge accumulation units FDe to FDh through a charge transfer channel Ch3.

In the configuration shown in FIG. 15, the gate control voltage Vt1 and gate control voltage Vt2 are typically controlled so that these voltages are raised to high levels not simultaneously but alternately. That is, at a certain time, the gate control voltage Vt1 is set to a high level. Then the gate control voltage Vt2 is set to a high level after the gate control voltage Vt1 is set to a low level. By alternating raising the gate control voltage Vt1 and gate control voltage Vt2 to a high level, it is possible to perform detection as in a configuration in which eight charge accumulation units, FDa to FDh, are arranged in line along a charge transfer channel Ch1. That is, detection can be performed in continuous eight time windows (8 phases).

As shown in FIG. 15, by disposing the multiple charge accumulation units on both sides of the charge transfer channel Ch1, it is possible to perform detection in more time windows while suppressing an increase in the length of the charge transfer channel Ch1. Since an increase in the length of the charge transfer channel Ch1 is suppressed, it is possible to reduce variations in sensitivity difference resulting from the extension of the charge transfer channel Ch1 and thus to form a pixel more precisely.

Third Embodiment

Figure 16:
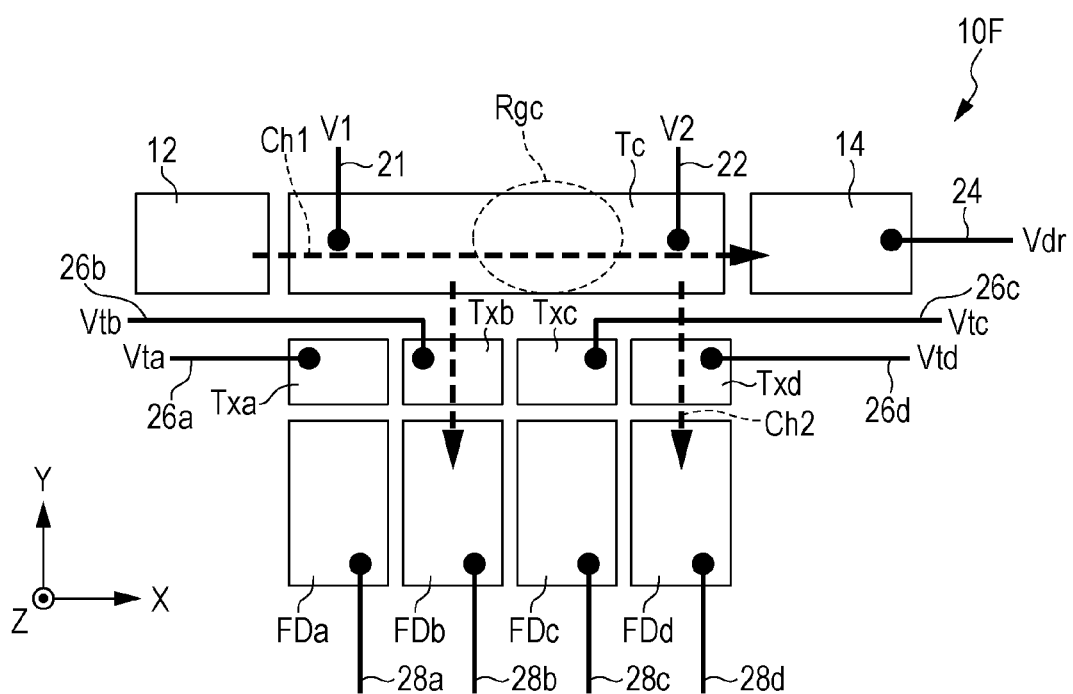
FIG. 16 is a schematic plan view of an imaging device of a third embodiment of the present disclosure.

FIG. 16 schematically shows an example of the pixel structure of an imaging device according to a third embodiment of the present disclosure. A pixel 10F shown in FIG. 16 differs from the pixel 10C shown in FIG. 8 in that the pixel 10F includes multiple transfer gate electrodes.

In the configuration shown in FIG. 16, transfer gate electrodes Txa to Txd are disposed between a charge transfer channel Ch1 and charge accumulation units FDa to FDd so as to correspond to the charge accumulation units FDa to FDd. As shown in FIG. 16, gate control lines 26a to 26d are connected to the transfer gate electrodes Txa to Txd, respectively. Thus, gate control voltages Vta to Vtd can be independently applied to the transfer gate electrodes Txa to Txd, respectively. That is, the pixel 10F includes the same number (four) of gates as the number of the charge accumulation units disposed along the charge transfer channel Ch1. These gates are disposed so as to correspond to four charge transfer channels Ch2.

For example, by selectively raising the gate control voltages Vtb and Vtd to high levels at a certain time in the configuration shown in FIG. 16, it is possible to perform control so that the two gates between the charge transfer channel Ch1 and charge accumulation units FDb and FDd are selectively opened, as shown in FIG. 16. By selectively opening some of the multiple gates disposed along the charge transfer channel Ch1, for example, it is possible to transfer, toward the charge accumulation unit FDd, signal charge around a region Rgc overlapping the charge accumulation unit FDc in the Y direction, of the signal charge moving through the charge transfer channel Ch1. That is, it is possible to favorably distribute the signal charge to two charge accumulation units (in this example, the charge accumulation units FDb and FDd) whose gates are opened.

In the pixel in which the multiple transfer gate electrodes are disposed so as to correspond to the multiple charge accumulation units, the charge accumulation unit closest to a photodiode 12 may be used as a drain. In the configuration shown in FIG. 16, for example, if, at a certain time, the gate control voltage Vta is raised to a high level to open the gate between the charge transfer channel Ch1 and charge accumulation unit FDa, signal charge that flows into the charge transfer channel Ch1 at that time and later is transferred preferentially to the charge accumulation unit FDa. Subsequently, even when the gate control voltages Vtb to Vtd are raised to high levels to open the gates between the charge transfer channel Ch1 and charge accumulation units FDb to FDd, the entry of extra charge into the charge accumulation units FDb to FDd can be suppressed by keeping the gate control voltage Vta at the high level.

As seen above, a configuration may be employed in which multiple transfer gate electrodes are disposed in a pixel so as to correspond to multiple charge accumulation units, and high-level gate control voltages are applied to the transfer gate electrodes at different timings. Note that if high-level voltages are applied to the transfer gate electrodes simultaneously, a detection operation similar to that in the second embodiment can be performed.

First Modification of Third Embodiment

Figure 17:
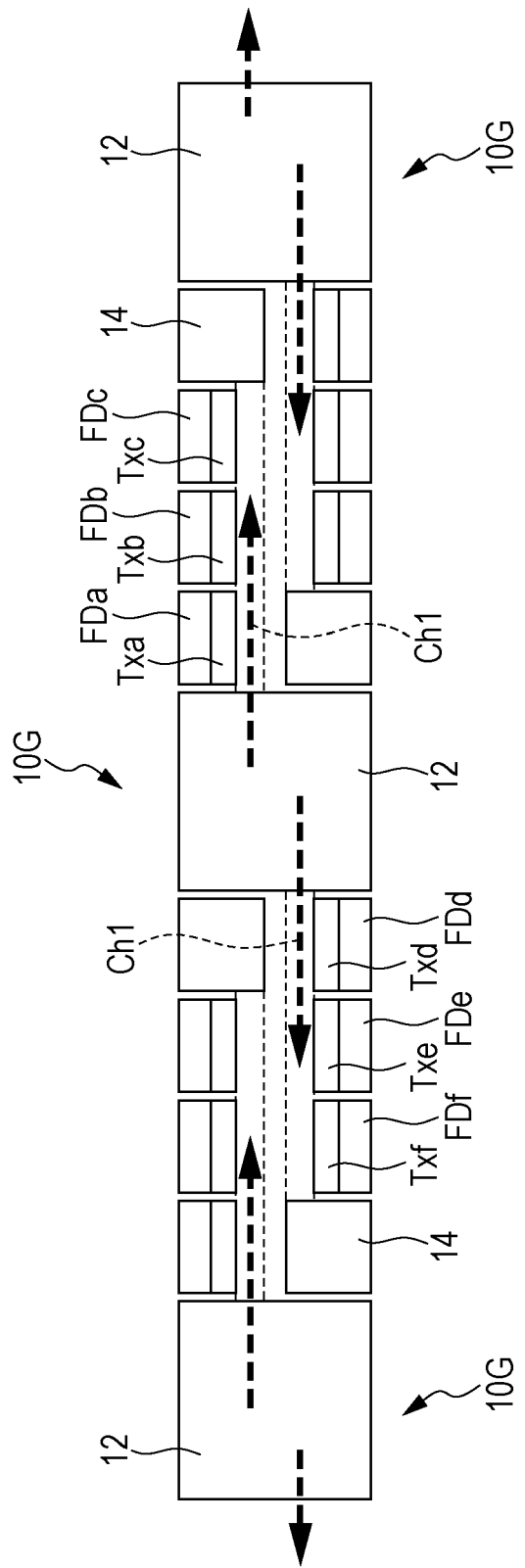
FIG. 17 is a schematic plan view of an imaging device of another example of the third embodiment of the present disclosure.

FIG. 17 shows another example of the pixel according to the third embodiment of the present disclosure. A pixel 10G shown in FIG. 17 differs from the pixel 10F described with reference to FIG. 16 in that the pixel 10G includes two drains 14 and therefore includes two charge transfer channels Ch1.

FIG. 17 shows a certain pixel 10G in a pixel array and parts of two pixels 10G located on the right and left sides of the pixel 10G. The pixel 10G shown in the center of FIG. 17 includes a photodiode 12 and two drains 14 spaced from the photodiode 12 on the right and left sides of the photodiode 12. That is, in this example, each pixel 10G in the pixel array includes two charge transfer channels Ch1 horizontally extending from the photodiode 12.

In FIG. 17, control electrodes on the charge transfer channels Ch1 are not shown. As described above, the control electrodes may be removed as long as an appropriate potential difference can be made between the photodiode 12 and drains 14. Lines, such as power supply lines connected to the drains 14, gate control lines, and read lines, are not shown in FIG. 17 to avoid the complication of the figure. Similarly, lines may not be shown in other drawings.

In the configuration shown in FIG. 17, charge accumulation units FDa to FDc are disposed above the charge transfer channel Ch1 extending rightward from the photodiode 12 located in the center of FIG. 17 so as to be along the charge transfer channel Ch1. Transfer gate electrodes Txa to Txc are disposed between the charge transfer channel Ch1 and the charge accumulation units FDa to FDc, respectively. Disposed under the charge transfer channel Ch1 is a charge transfer channel Ch1 extending from the photodiode 12 of the adjacent pixel 10G to the left of the figure. On the other hand, charge accumulation units FDd to FDf are disposed under a charge transfer channel Ch1 extending leftward from the photodiode 12 located in the center of FIG. 17 so as to be along the charge transfer channel Ch1. Transfer gate electrodes Txd to Txf are disposed between the charge transfer channel Ch1 and the charge accumulation units FDd to FDf. Disposed over the charge transfer channel Ch1 is a charge transfer channel Ch1 extending from a photodiode 12 of the adjacent pixel 10G to the right of the figure.

As above, a pixel may include multiple charge transfer channels Ch1 having drains disposed at terminating ends thereof. For example, by disposing charge transfer channels Ch1 in each pixel as shown in FIG. 17, denser pixel disposition can be realized. For example, by alternately raising the voltages applied to the two drains 14 to high levels in the configuration shown in FIG. 17, the two charge transfer channels Ch1 can be alternately used. By alternately moving signal charge generated in the photodiode 12 toward the two drains 14, it is possible to transfer the signal charge to the charge accumulation units disposed along one of the charge transfer channels Ch1 through a charge transfer channel Ch2 and at the same time to read charge from the charge accumulation units disposed along the other charge transfer channel Ch1. That is, a detection operation can be performed at higher speed.

Fourth Embodiment

Figure 18:
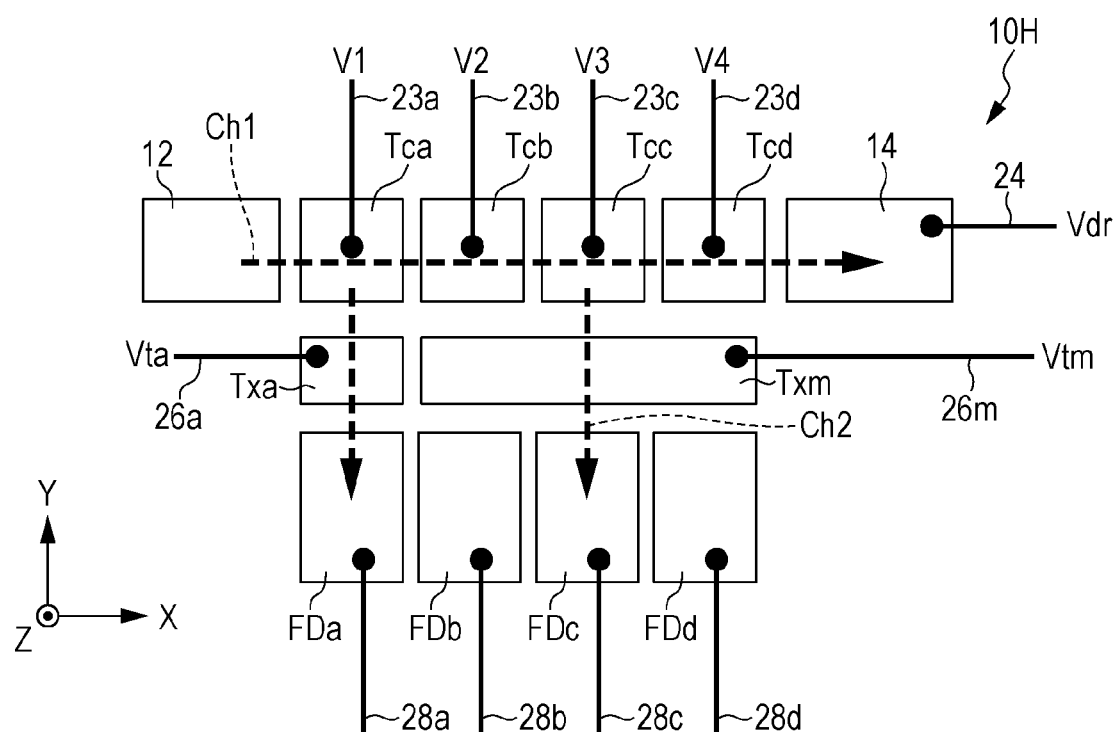
FIG. 18 is a schematic plan view of an imaging device of a fourth embodiment of the present disclosure.

FIG. 18 schematically shows an example of the pixel structure of an imaging device according to a fourth embodiment of the present disclosure. A pixel 10H shown in FIG. 18 mainly differs from the pixel 10C shown in FIG. 8 in that the pixel 10H has multiple control electrodes on a charge transfer channel Ch1.

In the configuration shown in FIG. 18, the pixel 10H includes control electrodes Tca to Tcd disposed on a charge transfer channel Ch1. As shown in FIG. 18, the control electrodes Tca to Tcd are disposed on the charge transfer channel Ch1 so as to correspond to four charge accumulation units, FDa to FDd, disposed along the charge transfer channel Ch1. The control electrode Tca has a width similar to the length (width) of the charge accumulation unit FDa in the direction along the charge transfer channel Ch1. A transfer gate electrode Txa also has a width similar to the length (width) of the charge accumulation unit FDa in the direction along the charge transfer channel Ch1.

In this example, the transfer gate electrode Txa connected to a gate control line 26a is disposed between the control electrode Tca on the charge transfer channel Ch1 and the charge accumulation unit FDa. The open and close of the gate between the charge transfer channel Ch1 and charge accumulation unit FDa is controlled by the level of a gate control voltage Vta applied to the gate control line 26a. Also, in this example, a single transfer gate electrode Txm is disposed between the control electrodes Tcb to Tcd on the charge transfer channel Ch1 and the charge accumulation units FDb to FDd. The transfer gate electrode Txm is connected to a gate control line 26m. The open and close of the gate between the charge transfer channel Ch1 and charge accumulation unit FDb, the gate between the charge transfer channel Ch1 and charge accumulation unit FDc, and the gate between the charge transfer channel Ch1 and charge accumulation unit FDd is collectively controlled by the level of a gate control voltage Vtm applied to the gate control line 26m.

As shown in FIG. 18, in this example, power supply lines 23a to 23d are connected to the control electrodes Tca to Tcd, respectively. That is, first to fourth voltages V1 to V4 can be independently applied to the control electrodes Tca to Tcd, respectively, through the power supply lines 23a to 23d.

Figure 19:
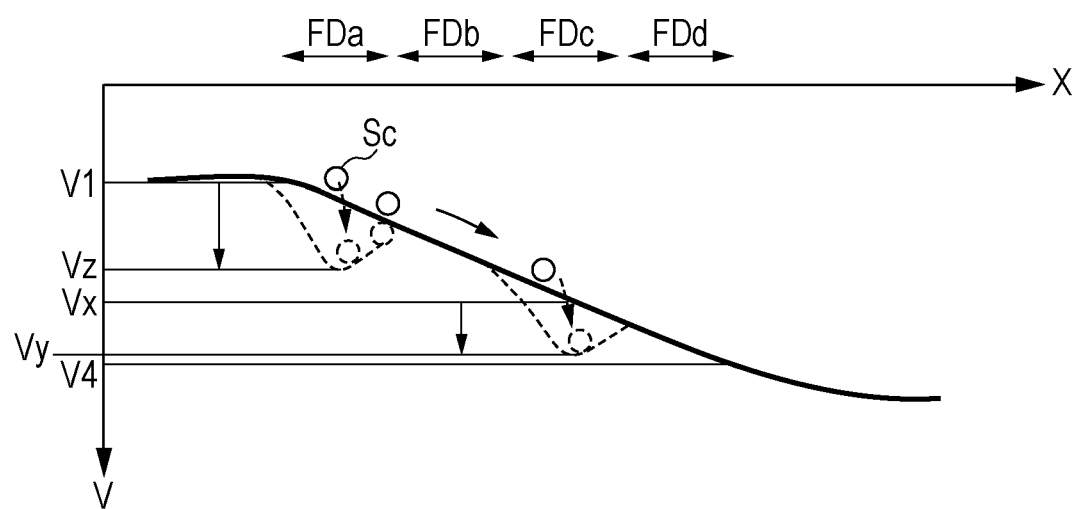
FIG. 19 is a graph showing an example of variations in potential in a charge transfer channel along the X direction according to the fourth embodiment.

Referring to FIGS. 18 and 19, an example of the operation of the pixel 10H will be described. FIG. 19 is a graph showing an example of variations in potential in the charge transfer channel Ch1 along the X direction. An example will be described below in which signal charge around a region Rgc (see FIG. 16 described above) overlapping the charge accumulation unit FDc in the Y direction, of the signal charge moving through the charge transfer channel Ch1 is transferred toward the charge accumulation unit FDc.

As in the embodiments described, the charge accumulation units FDa to FDd are reset before detecting light. After resetting the charge accumulation units FDa to FDd, the voltages V1 and V4 are applied to the control electrodes Tca and Tcd, respectively, through the power supply lines 23a and 23d. Also, a predetermined voltage Vdr is applied to a drain 14 through a power supply line 24. In this case, voltages V1, V4, and Vdr satisfying a relationship Vdr>V4>V1 are used. FIG. 19 schematically shows a graph of the potential in the charge transfer channel Ch1 along the X direction at this time using a solid line.

In this example, voltages are not applied to the control electrodes Tcb and Tcc from the outside of the pixel 10H. That is, at this point in time, the control electrodes Tcb and Tcc are floating. The potential of a portion under the control electrode Tcc, of the charge transfer channel Ch1 at this time is, for example, a potential Vx satisfying a relationship V4>Vx>V1.

After resetting the charge accumulation units FDa to FDd and applying the voltages to the control electrodes Tca and Tcd and drain 14, exposure of the photodiode 12 is started. As schematically shown by the solid line in FIG. 19, when exposure is started, a potential gradient is formed in the charge transfer channel Ch1 in such a manner that the potential is raised from the photodiode 12 toward the drain 14. Accordingly, the signal charge generated in the photodiode 12 moves through the charge transfer channel Ch1 toward the drain 14.

When time Td has passed after the start of exposure of the photodiode 12, a voltage Vy higher than the potential Vx is applied to the control electrode Tcc through the power supply line 23c. Further, a voltage Vz higher than the voltage V1 is applied to the control electrode Tca through the power supply line 23a. By raising the voltages applied to the control electrodes Tca and Tcc, the potential of the charge transfer channel Ch1 varies as schematically shown by broken lines in the graph of FIG. 19.

Due to the variations in the potential of the charge transfer channel Ch1, signal charge traveling a portion under the control electrode Tcc at time Td, of the signal charge moving through the charge transfer channel Ch1 is temporarily captured by the portion under the control electrode Tcc and the vicinity of the portion. Then, the potential Vtm of the gate control line is raised to a high level to open the gate between the charge transfer channel Ch1 and charge accumulation unit FDc. Thus, the signal charge temporarily held in the portion near the control electrode Tcc, of the charge transfer channel Ch1 can be transferred to the charge accumulation unit FDc through the charge transfer channel Ch2. Note that in this example, the voltage applied to the control electrode Tca is raised to Vz at time Td. Thus, charge generated in the photodiode 12 after time Td is released into the charge accumulation unit FDa through the charge transfer channel Ch2 between the charge transfer channel Ch1 and charge accumulation unit FDa. Accordingly, the entry into the charge accumulation unit FDc, of signal charge that flows into the charge transfer channel Ch1 after time Td is suppressed.

As described in the first to third embodiments, for example, by controlling the voltage V1 applied to the control electrode Tca and the voltage V4 applied to the control electrode Tcd, it is possible to control the potential gradient of the charge transfer channel Ch1, and thereby to adjust the speed at which the signal charge is transferred from the photodiode 12 to the drain 14. Further, for example, by increasing the potential difference between the voltage V1 and voltage V4, the speed at which signal charge is transferred to the drain 14 can be increased. Note that, if the potential gradient of the charge transfer channel Ch1 is made too steep in an attempt to improve the temporal resolution, correct detection may not be performed, since the signal charge is not transferred through the charge transfer channel Ch2 at a sufficient speed.

According to the fourth embodiment of the present disclosure, it is possible to selectively capture signal charge moving through a certain region at a certain time, of the signal charge moving through the charge transfer channel Ch1 and then to transfer the captured signal charge to a charge accumulation unit through the charge transfer channel Ch2. According to the operation described with reference to FIGS. 18 and 19, for example, the signal charge can be transferred to a charge accumulation unit through the charge transfer channel Ch2 at the desired time later than the time when the signal charge is selectively captured on the charge transfer channel Ch1. That is, it is possible to time-resolve signal charge resulting from the entry of light in a time window using the desired time as the start point and capture the resulting signal charge, and then to transfer the captured signal charge to a charge accumulation unit at a time different from that time. As seen above, according to the fourth embodiment of the present disclosure, a detection operation can be performed at higher speed, regardless of the speed at which signal charge is transferred through the charge transfer channel Ch2.

While, in the example described above, the signal charge is temporarily captured by the portion below the control electrode Tcc and its vicinity, the signal charge may be temporarily captured at a portion below a control electrode other than the control electrode Tcc and the vicinity of the portion. The signal charge may also be temporarily captured at portions below two or more control electrodes and the vicinity of the portions.

A configuration may be employed in which the potential of a charge accumulation unit (the charge accumulation unit FDa) closest to a photodiode 12, of multiple charge accumulation units disposed along a charge transfer channel Ch1 is fixed; and that charge accumulation unit is used as a drain by opening the gate between that charge accumulation unit and charge transfer channel Ch1. In this case, that charge accumulation unit need not be reset before detecting light.

First Modification of Fourth Embodiment

Figure 20:
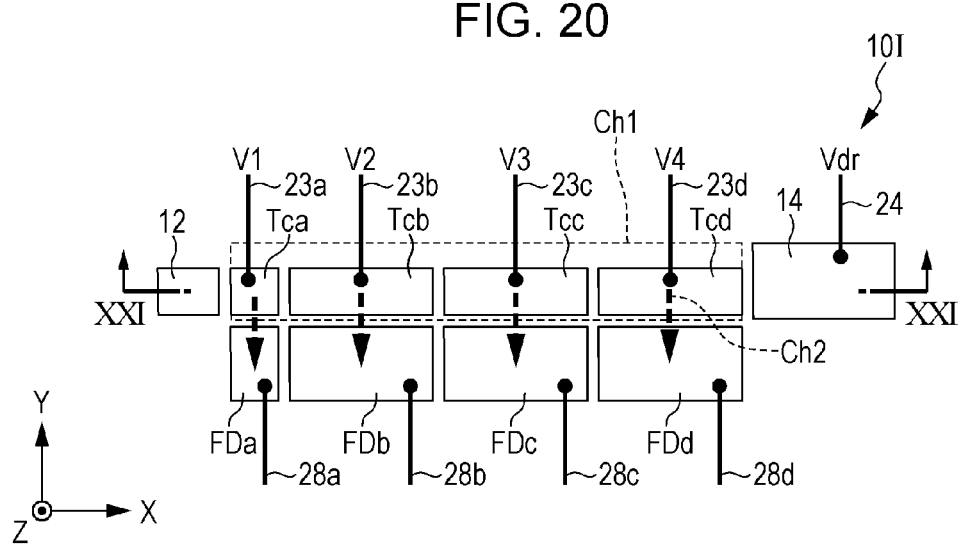
FIG. 20 is a schematic plan view of an imaging device of another example of the fourth embodiment of the present disclosure.
Figure 21:
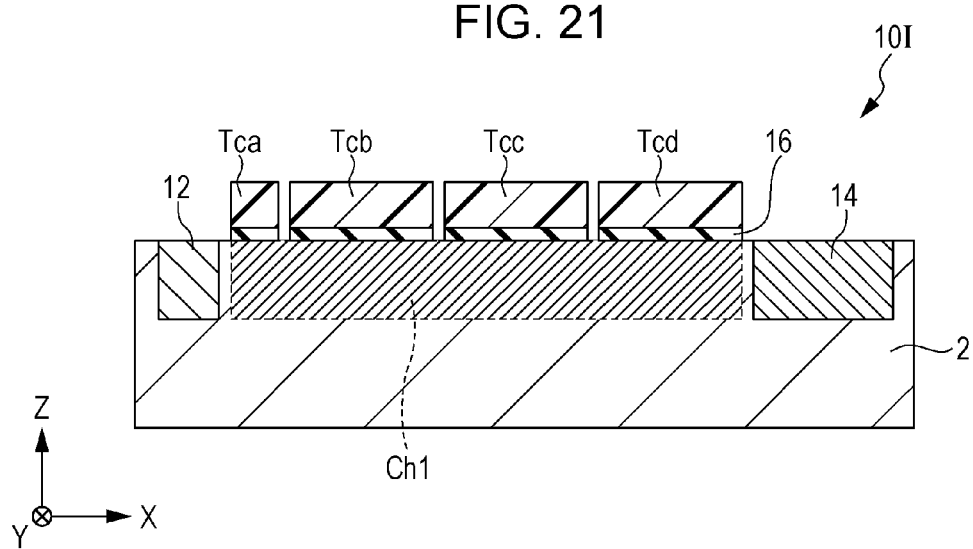
FIG. 21 is a sectional view taken along line XXI-XXI in FIG. 20.

FIG. 20 shows another example of the pixel according to the fourth embodiment of the present disclosure. FIG. 21 schematically shows a section taken along line XXI-XXI in FIG. 20. A pixel 10I shown in FIGS. 20 and 21 differs from the pixel 10H described with reference to FIG. 18 in that the pixel 10I does not have a transfer gate electrode between a charge transfer channel Ch1 and charge accumulation units.

As shown in FIGS. 20 and 21, the pixel 10I has multiple control electrodes, Tca to Tcd, disposed over and along the charge transfer channel Ch1. The control electrodes Tca to Tcd are disposed on an insulating layer 16 formed on a semiconductor substrate 2, and first to fourth voltages V1 to V4 can be independently applied thereto through power supply lines 23a to 23d, as in the pixel 10H described with reference to FIG. 18. Note that in the configuration shown in FIGS. 20 and 21, no insulating layer 16 is formed between every adjacent two control electrodes. However, for example, an insulating layer 16 continuously extending from the control electrode Tca to control electrode Tcd may be formed.

As shown in FIG. 20, the pixel 10I does not have a transfer gate electrode between the charge transfer channel Ch1 and charge accumulation units FDa to FDd. As will be described later, in the pixel 10I, potential differences are made between the charge transfer channel Ch1 and charge accumulation units FDa to FDd. Thus, signal charge in the charge transfer channel Ch1 is transferred to the charge accumulation units FDa to FDd. It is similar to the pixels 10A to 10H described above in that the pixel 10I includes a charge transfer channel Ch2 that transfers signal charge from the charge transfer channel Ch1 connecting the photodiode 12 and drain 14 toward the charge accumulation units.

Figure 22:
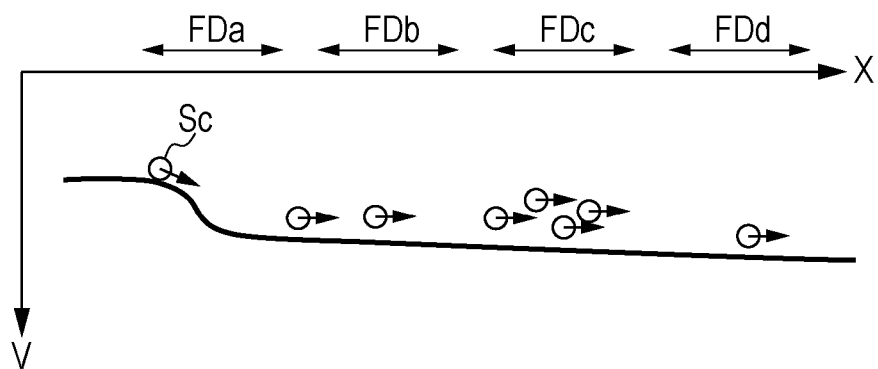
FIG. 22 is a graph showing an example of variations in potential in a charge transfer channel along the X direction according to another example of the fourth embodiment.
Figure 23:
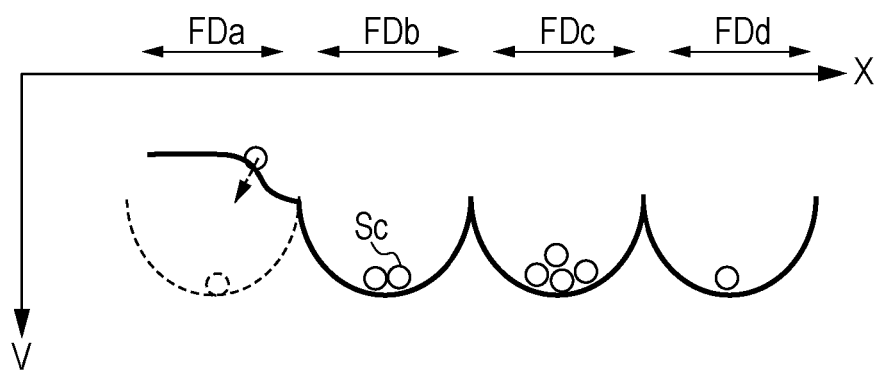
FIG. 23 is a graph showing another example of variations in potential in a charge transfer channel along the X direction according to another example of the fourth embodiment.

Referring to FIGS. 22 and 23, an example of the operation of the pixel 10I will be described. FIGS. 22 and 23 are graphs showing an example of variations in potential in the charge transfer channel Ch1 along the X direction.

As in the embodiments described, the charge accumulation units FDa to FDd are reset before detecting light. After resetting the charge accumulation units FDa to FDd, for example, the voltages V2 and V4 are applied to the control electrodes Tcb and Tcd through the power supply lines 23b and 23d. Also, a predetermined voltage Vdr is applied to the drain 14 through a power supply line 24. At this time, voltages V2, V4, and Vdr satisfying a relationship Vdr>V4>V2 are used. The control electrodes Tca and Tcc are floating. FIG. 22 schematically shows a graph of the potential in the charge transfer channel Ch1 along the X direction at this time.

After resetting the charge accumulation units FDa to FDd and applying the voltages to the control electrodes Tcb and Tcd and drain 14, exposure of the photodiode 12 is started. As shown in FIG. 22, when exposure is started, a potential gradient is formed in the charge transfer channel Ch1 in such a manner that the potential is raised from the photodiode 12 toward the drain 14. Accordingly, the signal charge generated in the photodiode 12 moves through the charge transfer channel Ch1 toward the drain 14.

When time Td has passed after the start of exposure of the photodiode 12, voltages higher than V4 are simultaneously applied to the control electrodes Tcb to Tcd through the power supply lines 23b to 23d. When the high-level voltages are simultaneously applied to the control electrodes Tcb to Tcd, the potential of the charge transfer channel Ch1 varies as shown in FIG. 23. In this case, the potential varies in such a manner that the energy of the signal charge is reduced under the control electrodes Tcb to Tcd. For this reason, signal charge traveling under the control electrode Tcb at time Td, of the signal charge moving through the charge transfer channel Ch1 is captured at a portion below the control electrode Tcb and its vicinity. Similarly, signal charge traveling under the control electrode Tcc at time Td is captured at a portion below the control electrode Tcc and its vicinity, and signal charge traveling under the control electrode Tcd is captured at a portion under the control electrode Tcd and its vicinity.

However, if nothing is done in this state, signal charge generated in the photodiode 12 after time Td would be mixed with the signal charge captured at time Td. For this reason, at time Td, a high-level voltage is also applied to the control electrode Tca. When a high voltage is applied to the control electrode Tca, the potential of the charge transfer channel Ch1 varies as schematically shown by a broken line in FIG. 23. When a high-level voltage is applied to the control electrode Tca, the energy of the signal charge is reduced under the control electrode Tca, and signal charge traveling a portion under the control electrode Tca at time Td, of the signal charge moving through the charge transfer channel Ch1 is captured at a portion under the control electrode Tca and its vicinity. That is, the signal charge generated in the photodiode 12 after time Td can be captured. Thus, entry of noise can be suppressed.

After the signal charge is temporarily captured at portions under the control electrodes, the captured signal charge is transferred to the charge accumulation units FDa to FDd through the charge transfer channel Ch2. For example, by connecting the control electrodes Tca to Tcd and voltage sources for supplying a high voltage through capacitative elements, the potentials of the charge accumulation units FDa to FDd are made higher than the potentials of the portions under the control electrodes Tca to Tcd, of the charge transfer channel Ch1. Thus, it is possible to form a potential gradient between the charge transfer channel Ch1 and charge accumulation units FDa to FDd and to transfer the signal charge temporarily captured in the charge transfer channel Ch1 to the charge accumulation units FDa to FDd. Then, the amount of the charge transferred to the charge accumulation units FDb to FDd is read. Note that in order to cause the charge accumulation unit FDa to serve as a drain after time Td, a voltage source for supplying a high voltage and the charge accumulation unit FDa may be connected together without through a capacitative element.

As described above, in the embodiments of the present disclosure, signal charge moving from the photoelectric conversion unit toward the drain is transferred from the movement channel toward the charge accumulation units rather than directly transferring the signal charge from the photoelectric conversion unit to the charge accumulation units and reading the transferred charge. Thus, signal charge can be time-resolved in accordance with the traveling distance from the photoelectric conversion unit, and the temporal resolution in detection can be improved.

The technology of the present disclosure is not limited to the above embodiments, and various modifications can be made thereto. For example, the photodiode 12 may be a diode having a structure in which multiple sensors sensitive to different wavelength ranges are stacked in the thickness direction of a substrate (e.g., Foveon X3 provided by Foveon, Inc., "Foveon X3" is a registered trademark). The photoelectric conversion unit of the present disclosure need not be a photodiode and may be a photoelectric conversion film stacked on a semiconductor substrate in place of the photodiode 12. The photoelectric conversion film can be formed of an organic material, or an inorganic material, such as amorphous silicon.

The imaging devices of the present disclosure can be used in a variety of camera systems and sensor systems, including digital still cameras, medical cameras, monitoring cameras, car-mounted cameras, digital single-lens reflex cameras, and digital mirrorless single-lens cameras.

What is claimed is:

1. An imaging device comprising:
   a photoelectric converter that generates charge;
   a first charge transfer channel having a first end electrically connected to the photoelectric converter and a second end, the first charge transfer channel transferring the charge in a direction from the first end to the second end;
   a second charge transfer channel diverging from the first charge transfer channel at a first position of the first charge transfer channel, the second charge transfer channel transferring a first part of the charge;
   a third charge transfer channel diverging from the first charge transfer channel at a second position of the first charge transfer channel, the second position being different from the first position in the direction, the third charge transfer channel transferring a second part of the charge;
a first charge accumulator that accumulates at least a part of the first part of the charge; and
a second charge accumulator that accumulates at least a part of the second part of the charge, wherein
the imaging device does not comprise a gate that switches between cutoff and transfer of charge, in the first charge transfer channel.

2. The imaging device according to claim 1, further comprising:
a first gate, in the second charge transfer channel, switching between cutoff and transfer of the first part of the charge; and
a second gate, in the third charge transfer channel, switching between cutoff and transfer of the second part of the charge.

3. The imaging device according to claim 2, wherein the first gate and the second gate are a single gate.

4. The imaging device according to claim 1, further comprising a drain electrically connected to the second end, releasing charge transferred from the first charge transfer channel.

5. The imaging device according to claim 1, further comprising a third charge accumulator electrically connected to the second end, accumulating charge transferred from the first charge transfer channel.

6. The imaging device according to claim 1, wherein the first charge transfer channel has an electric potential gradient in at least a part of a distance between the first end and the second end, for transferring the charge.

7. An imaging device comprising:
a photoelectric converter that generates charge;
a first charge transfer channel having a first end electrically connected to the photoelectric converter and a second end, the first charge transfer channel transferring the charge in a direction from the first end to the second end;
a second charge transfer channel diverging from the first charge transfer channel at a first position of the first charge transfer channel, the second charge transfer channel transferring a first part of the charge;
a third charge transfer channel diverging from the first charge transfer channel at a second position of the first charge transfer channel, the second position being different from the first position in the direction, the third charge transfer channel transferring a second part of the charge;
a first charge accumulator that accumulates at least a part of the first part of the charge; and
a second charge accumulator that accumulates at least a part of the second part of the charge, wherein
the first charge transfer channel is a single channel.

8. The imaging device according to claim 7, further comprising:
a first gate, in the second charge transfer channel, switching between cutoff and transfer of the first part of the charge; and
a second gate, in the third charge transfer channel, switching between cutoff and transfer of the second part of the charge.

9. The imaging device according to claim 8, wherein the first gate and the second gate are a single gate.

10. The imaging device according to claim 7, further comprising a drain electrically connected to the second end, releasing charge transferred from the first charge transfer channel.

11. The imaging device according to claim 7, further comprising a third charge accumulator electrically connected to the second end, accumulating charge transferred from the first charge transfer channel.

12. The imaging device according to claim 7, wherein the first charge transfer channel has an electric potential gradient in at least a part of a distance between the first end and the second end, for transferring the charge.

13. An imaging device comprising:
a photoelectric converter that generates charge;
a first charge transfer channel having a first end electrically connected to the photoelectric converter and a second end, first charge transfer channel transferring the charge in a direction from the first end to the second end without cutoff;
a second charge transfer channel diverging from the first charge transfer channel at a first position of the first charge transfer channel, the second charge transfer channel transferring a first part of the charge;
a third charge transfer channel diverging from the first charge transfer channel at a second position of the first charge transfer channel, the second position being different from the first position in the direction, the third charge transfer channel transferring a second part of the charge;
a first charge accumulator that accumulates at least a part of the first part of the charge; and
a second charge accumulator that accumulates at least a part of the second part of the charge.

14. The imaging device according to claim 13, further comprising:
a first gate, in the second charge transfer channel, switching between cutoff and transfer of the first part of the charge; and
a second gate, in the third charge transfer channel, switching between cutoff and transfer of the second part of the charge.

15. The imaging device according to claim 14, wherein the first gate and the second gate are a single gate.

16. The imaging device according to claim 13, further comprising a drain electrically connected to the second end, releasing charge transferred from the first charge transfer channel.

17. The imaging device according to claim 13, further comprising a third charge accumulator electrically connected to the second end, accumulating charge transferred from the first charge transfer channel.

18. The imaging device according to claim 13, wherein the first charge transfer channel has an electric potential gradient in at least a part of a distance between the first end and the second end, for transferring the charge.

* * * * *